(12) United States Patent
Tajima et al.

(10) Patent No.: US 11,491,478 B2
(45) Date of Patent: Nov. 8, 2022

(54) DISPENSING CYLINDER, AND DISPENSING DEVICE AND DISPENSING TREATMENT METHOD USING SAME

(71) Applicant: UNIVERSAL BIO RESEARCH Co., Ltd., Matsudo (JP)

(72) Inventors: Hideji Tajima, Matsudo (JP); Kazuhiro Nakamura, Matsudo (JP); Yu Sugiyama, Matsudo (JP)

(73) Assignee: UNIVERSAL BIO RESEARCH Co., Ltd., Matsudo (JP)

( * ) Notice: Subject to any disclaimer, the term of this patent is extended or adjusted under 35 U.S.C. 154(b) by 623 days.

(21) Appl. No.: 16/327,130

(22) PCT Filed: Aug. 18, 2017

(86) PCT No.: PCT/JP2017/029679
§ 371 (c)(1),
(2) Date: Feb. 21, 2019

(87) PCT Pub. No.: WO2018/038019
PCT Pub. Date: Mar. 1, 2018

(65) Prior Publication Data
US 2019/0224666 A1 Jul. 25, 2019

(30) Foreign Application Priority Data

Aug. 22, 2016 (JP) .............................. JP2016-162141

(51) Int. Cl.
*G01N 1/14* (2006.01)
*B01J 4/02* (2006.01)
(Continued)

(52) U.S. Cl.
CPC .............. *B01L 3/0275* (2013.01); *B01J 4/02* (2013.01); *B01L 3/02* (2013.01); *B01L 3/0206* (2013.01);
(Continued)

(58) Field of Classification Search
None
See application file for complete search history.

(56) References Cited

U.S. PATENT DOCUMENTS

| | | | | |
|---|---|---|---|---|
| 3,757,585 A | * | 9/1973 | Heller | A61M 1/00 |
| | | | | 73/864.18 |
| 4,141,250 A | * | 2/1979 | D'Autry | B01L 3/0231 |
| | | | | 222/309 |

(Continued)

FOREIGN PATENT DOCUMENTS

| | | |
|---|---|---|
| DE | 1907110 | 11/1970 |
| JP | 62-170852 A | 7/1987 |

(Continued)

OTHER PUBLICATIONS

European Search Report for EP17843499, dated Feb. 19, 2019.

(Continued)

*Primary Examiner* — Brian R Gordon
(74) *Attorney, Agent, or Firm* — Andrus Intellectual Property Law, LLP

(57) ABSTRACT

A dispensing cylinder capable of performing a dispensing treatment for both minute and large amounts of liquid includes: a cylinder having a cavity; a nozzle provided at one end of the cylinder, having a through hole in fluid communication with the cavity and extending in an axial direction of the cavity, and a plunger slidable in the cavity in the axial direction. The cavity has a large diameter region having a large inner peripheral surface and a small diameter region having a second inner peripheral surface. The plunger has a thick shaft portion slidable in the large diameter region and a thin shaft portion protruding from a distal end of the thick shaft portion in the axial direction and slidable in the small diameter region.

11 Claims, 9 Drawing Sheets

(51) Int. Cl.
  *B01L 3/02* (2006.01)
  *G01N 35/10* (2006.01)
  *G01N 1/00* (2006.01)
  *B01L 3/00* (2006.01)

(52) U.S. Cl.
  CPC ............. *B01L 3/0293* (2013.01); *B01L 3/565* (2013.01); *G01N 1/00* (2013.01); *G01N 1/14* (2013.01); *G01N 35/10* (2013.01); *B01L 2200/06* (2013.01); *B01L 2200/16* (2013.01); *G01N 2001/1418* (2013.01)

(56) References Cited

U.S. PATENT DOCUMENTS

| | | | | |
|---|---|---|---|---|
| 4,478,094 | A * | 10/1984 | Salomaa | G01N 1/38 422/65 |
| 4,593,837 | A * | 6/1986 | Jakubowicz | B01L 3/0275 422/931 |
| 4,616,514 | A * | 10/1986 | Magnussen, Jr. | B01L 3/0227 422/926 |
| 4,625,572 | A * | 12/1986 | Yamashita | G01N 35/1083 73/864.16 |
| 4,679,446 | A * | 7/1987 | Sheehan | B01L 3/0217 422/552 |
| 5,696,330 | A * | 12/1997 | Heinonen | B01L 3/0231 73/864.13 |
| 5,817,955 | A * | 10/1998 | Gherson | F04B 5/00 73/864.35 |
| 6,021,680 | A * | 2/2000 | Inagaki | B01L 3/0231 73/864.01 |
| 6,399,024 | B1 * | 6/2002 | Bevirt | B01L 3/0227 422/511 |
| 6,589,483 | B1 * | 7/2003 | Maeda | G01N 35/1065 73/863.25 |
| 6,627,446 | B1 * | 9/2003 | Roach | G01N 27/44791 436/514 |
| 2005/0220676 | A1 | 10/2005 | Tran | |
| 2013/0029324 | A1 * | 1/2013 | Rajagopal | B01L 3/502 435/6.1 |
| 2015/0209777 | A1 | 7/2015 | Petrek et al. | |
| 2017/0128932 | A1 * | 5/2017 | Ito | G01N 35/1081 |
| 2021/0106985 | A1 * | 4/2021 | Tajima | B01L 3/0217 |

FOREIGN PATENT DOCUMENTS

| | | |
|---|---|---|
| JP | 06-094584 A | 4/1994 |
| JP | 09-029111 A | 2/1997 |
| JP | 2005-249521 A | 9/2005 |
| JP | 2011-163771 A | 8/2011 |
| JP | 2013-250191 A | 12/2013 |

OTHER PUBLICATIONS

International Search Report (including translation) and Written Opinion received in Patent Cooperation Treaty Application No. PCT/JP2017/029679, dated Oct. 31, 2017, 11 pages.

\* cited by examiner

DISPENSING CYLINDER, AND DISPENSING DEVICE AND DISPENSING TREATMENT METHOD USING SAME

CROSS REFERENCE

This application is a United States national phase application of co-pending international patent application number PCT/JP2017/029679, filed Aug. 18, 2017, which claims priority to Japanese patent application number 2016-162141, filed Aug. 22, 2016, the entire disclosures of which are hereby incorporated herein by reference.

TECHNICAL FIELD

The present invention relates to a dispensing cylinder of a dispensing device, and a dispensing device and a dispensing treatment method using the dispensing cylinder, and specifically to a dispensing cylinder for sucking and discharging gas through a nozzle in order to cause liquid such as a specimen or a reagent to flow into a dispensing tip detachably attached to the nozzle from a distal end opening and to flow out of the distal end opening, and a dispensing device and a dispensing treatment method using the dispensing cylinder.

In recent years, as a pretreatment for analyzing a specimen, a dispensing device is used for dispensing a specimen and a reagent or dispensing a liquid sample, for example, for blending the sample.

The dispensing device includes: an externally provided container group including a plurality of containers for storing a specimen, various reagents, and the like; a disposable dispensing tip which can be inserted into the containers, can make a liquid sample to flow thereinto to store a predetermined amount of the liquid sample, and can make the liquid sample to flow out thereof; a nozzle to which the dispensing tip is detachably attached; and a dispensing cylinder communicating with the nozzle and sucking and discharging gas.

One or more of the nozzles and dispensing cylinders are arranged in a dispensing head. The dispensing head is movably provided with respect to the container group, and can suck and discharge a predetermined amount of liquid reagent all at once with respect to the plurality of containers.

In such a dispensing device, in some treatment objects, the dispensing amount required largely changes depending on the type or the like of a liquid sample to be dispensed. For example, in a case of performing a treatment of extracting a nucleic acid from a sample and determining a base sequence of the nucleic acid using a single dispensing device, a large amount, for example, about 1000 µL of liquid is used for extracting the nucleic acid, while a minute amount, for example, about 5 µL of liquid is used for amplifying the nucleic acid.

In these treatments, for example, it is necessary to cope with a wide range of dispensing amount of 0.5 µL to 1000 µL. Conventionally, a treatment for a minute amount is also performed using a cylinder device for a large amount. Alternatively, a dispensing cylinder can be exchanged, and two types of cylinder members having different cylinder inner diameters and different piston member outer diameters are used. A minute volume cylinder including a small inner diameter cylinder and a small diameter piston member, for example, having 0.5 µL to 30 µL and a large volume cylinder including a large inner diameter cylinder and a large diameter piston member, for example, having 20 µL to 1000 µL are exchanged and used in some cases.

Furthermore, a treatment for a minute amount and a treatment for a large amount are performed using a cylinder having a mechanism coping with both a minute amount and a large amount using a single cylinder.

However, in a case where a treatment for a minute amount is also performed using a cylinder for a large amount, it may be impossible to obtain high accuracy for the minute amount. In a case where a dispensing cylinder is exchanged and used, even if high accuracy can be obtained, a large burden is imposed on a user, and a dispensing treatment may be interruµLed to make it impossible to perform an efficient and rapid treatment.

Meanwhile, in a case where a treatment for a minute amount and a treatment for a large amount are performed using a cylinder having a mechanism coping with both a minute amount and a large amount, the total length of a plunger and a cylinder is large, a device scale is large, and it is difficult for a user to handle the device. In addition, the mechanism is complicated, it takes time and labor to manufacture the device, and the device may be expensive disadvantageously.

CITATION LIST

Patent Literature

Patent Literature 1: JP 2013-250191 A
Patent Literature 2: JP 2011-163771 A
Patent Literature 3: JP 6-94584 A
Patent Literature 4: JP 2005-249521 A
Patent Literature 5: JP 9-29111 A

SUMMARY OF INVENTION

Technical Problem

Therefore, the present invention has been achieved in order to solve the above problems. A first object of the present invention is to provide a compact and easily handled dispensing cylinder capable of dispensing both a minute amount of liquid and a large amount of liquid using a single dispensing cylinder, and a dispensing device and a dispensing treatment method using the dispensing cylinder. A second object of the present invention is to provide an inexpensive dispensing cylinder having a cylinder mechanism with simple operation and structure, having a small number of components, and easily manufactured, and a dispensing device and a dispensing treatment method using the dispensing cylinder. A third object of the present invention is to provide a highly reliable dispensing cylinder capable of dispensing both a minute amount and a large amount with highly accuracy, and a dispensing device and a dispensing treatment method using the dispensing cylinder.

Solution to Problem

A first aspect of the present invention is a dispensing cylinder including: a cylinder having a cavity therein; a nozzle provided at one end of the cylinder, having a through hole communicating with the cavity and extending in an axial direction of the cavity, and making a dispensing tip attachable externally; and a plunger provided so as to be slidable in the cavity in the axial direction, in which the cavity has a large diameter region having a large diameter inner peripheral surface and a small diameter region provided so as to be closer to the nozzle than the large diameter region and having a small diameter inner peripheral surface, the plunger has a thick shaft portion provided so as to be slidable in the large diameter region and a thin shaft portion protruding from a distal end of the thick shaft portion in the axial direction and provided so as to be slidable in the small diameter region, and a length of the thin shaft portion in the axial direction is shorter than a stroke of the thick shaft portion.

Here, the "large diameter" refers to a larger diameter than the "small diameter", and the inner diameter of the through hole may be the same as or larger than the inner diameter (small diameter) of the small diameter region. Therefore, a part of the thin shaft portion can be inserted into the through hole. The thick shaft portion and the thin shaft portion are fixed to a single plunger. The large diameter region and the small diameter region are preferably cylindrical. The thick shaft portion and the thin shaft portion are preferably columnar, and are preferably formed coaxially.

The "thick shaft" represents a thicker shaft than the "thin shaft". Here, the "stroke of the thick shaft portion" refers to a distance (hereinafter referred to as "D") between a top dead center (an upper limit position of the thick shaft portion) and a bottom dead center (a lower limit position of the thick shaft portion) in the axial direction when the thick shaft portion performs a vertical movement, and does not necessarily coincide with the total length (hereinafter referred to as "D0") of the large diameter region in the axial direction. This is because the thick shaft portion has a thickness or a length in the axial direction (a maximum length from the distal end of the thick shaft portion to a portion having a sealing function, hereinafter referred to as "d1" or "d1"), and a distance (hereinafter referred to as "r0") from the bottom dead center of the thick shaft portion to a boundary with the small diameter region is not necessarily zero. That is, $D \leq D0-r0-d1$ is satisfied. The "axis" is a "central axis" or a "symmetry axis" extending through the cavity or the like.

Here, for either one of the outer peripheral surface of the thick shaft portion and the inner peripheral surface of the large diameter region sliding with each other and either one of the outer peripheral surface of the thin shaft portion and the inner peripheral surface of the small diameter region sliding with each other, a portion having a sealing function (function of blocking passage of a fluid in the axial direction) is preferably limited to an annular portion having a shortened length in the axial direction and surrounding the axis from a viewpoint of smooth operation.

For example, as illustrated in FIG. 2, the portion having the sealing function is limited to an annular portion (airtight seal member 17b) in the outer peripheral surface of the thick shaft portion, and the portion having the sealing function is limited to an annular portion (airtight seal member 17a) in the inner peripheral surface of the small diameter region. A distance of the thick shaft portion from the bottom dead center of a lower end surface of the thick shaft portion is represented by d ($d \leq D \leq D0-r0-d1$). A sum of the lengths of the small diameter region and the through hole along the axis is represented by d2. The length of the thin shaft portion in the axial direction is represented by d3 (or d3'. The length refers to a maximum length of the thin shaft portion having a sealing function and passing while sliding in the small diameter region when a minute amount of liquid is sucked and discharged, measured from a distal end surface side of the thick shaft portion, and is determined depending on the position of an airtight seal member in the thin shaft portion or the small diameter region and the length of the small diameter region in the axial direction. For example, in a case where the length of a sliding portion of the thin shaft portion in the axial direction is longer than that of the small diameter region and the entire sliding portion of the thin shaft portion is inserted in the small diameter region, the length corresponds to the length of the sliding portion of the thin shaft portion. In a case where the length of the sliding portion of the thin shaft portion is shorter than that of the small diameter region, for example, in a case where the thin shaft portion slides in the entire small diameter region, the length corresponds to the total length of the small diameter region). In this case, a portion which is not inserted into the small diameter region and does not pass therethrough (even if the portion is slidable) is not referred to as the thin shaft portion. However, a portion which is inserted into the small diameter region and passes therethrough when the minute amount of liquid is sucked and discharged is referred to as the thin shaft portion even if the portion does not slide. The thick shaft portion with respect to the large diameter region also has a similar relationship. Note that a length from the distal end of the thick shaft portion to a distal end of the thin shaft portion in the axial direction is r0+d3. In this case, d3 or d3+r0 needs to be shorter than d2 because the distal end of the thin shaft portion should not protrude from a nozzle. In a case where a distance from the bottom dead center of the lower end surface of the thick shaft portion is represented by d, a distance from a bottom dead center of the thin shaft portion is also d for the thin shaft portion. Therefore, in a case where the thick shaft portion is located at the bottom dead center, the thin shaft portion is also preferably located at the bottom dead center thereof. Therefore, the length d3 of the thin shaft portion in the axial direction is equal to a length from the position of the bottom dead center of the thin shaft portion to the uppermost end of the small diameter region. Meanwhile, like the thick shaft portion, a top dead center of the thin shaft portion is determined by a predetermined amount. Even if the amount of liquid is the largest, the top dead center is located at an upper end of the small diameter region (D0−d1 in a case of the large diameter region). Even if the thin shaft portion is located at the top dead center, the thick shaft portion is located in front of the top dead center of the thick shaft portion.

In order to further make suction possible by sliding of the thick shaft portion in a state where the thin shaft portion is withdrawn from the small diameter region, the stroke D needs to be longer than d3. Therefore, conditions of relational formulas of $d2>d3$ and $D \geq d>d3$ are required. In this case, in a large amount suction and discharge section, gas corresponding to approximately $(d-d3) \times S1$ (large diameter cross-sectional area) is sucked into the large diameter region, and a large amount of liquid corresponding thereto is sucked into a dispensing tip (actually, also depending on the shape of the distal end of the thick shaft portion or the like). Meanwhile, in a minute amount suction and discharge section, $0 \leq d \leq d3$ is satisfied, gas corresponding to approximately $d \times S2$ (small diameter cross-sectional area) can be sucked (actually, also depending on the shape of the distal end of the thin shaft portion or the like), and a minute amount of liquid is sucked into the dispensing tip in accordance therewith. Incidentally, as illustrated in FIGS. 1 and 2, in a case where the bottom dead center of the thick shaft portion is located at the lowermost end of the large diameter region, r0=0 is satisfied, and a length from the distal end surface of the thick shaft portion to the distal end of the thin shaft portion in the axial direction is d3.

Note that the large amount suction and discharge section and the minute amount suction and discharge section do not overlap with each other. That is, in the large amount suction and discharge section, the thick shaft portion and the large diameter region slide, the thin shaft portion and the small diameter region do not slide. In the minute amount suction and discharge section, the thin shaft portion and the small diameter region slide, and the thick shaft portion and the large diameter region do not slide. Therefore, a floating region described later is provided between the large diameter region and a side of the small diameter region.

Note that a portion of the plunger (rod portion) protruding from the distal end of the thick shaft portion to reach the thin shaft portion and having a length of the r0 does not need to be insertable into the small diameter region unlike the thin shaft portion, but only needs to have an outer diameter so as to be floatable in the large diameter region or in a floating region described later.

If the position of the bottom dead center of the thick shaft portion is set such that r0≠0 is satisfied and r0 corresponds to the length of a nozzle in the axial direction, as described later, the plunger can be lowered beyond the bottom dead center of the stroke D. Therefore, a mechanism for detaching a dispensing tip using the operation can be provided outside the dispensing cylinder using a mechanism for driving the plunger. In this case, the portion of the plunger needs to have such an outer diameter that the portion of the plunger is floatable in the small diameter region (that is, an outer diameter thinner than the thin shaft portion).

The large diameter region is cylindrical, the large diameter is, for example, 6 mm to 15 mm and preferably 10 mm, the length of the large diameter region (D0) is, for example, 10 mm to 50 mm and preferably 30 mm, and therefore the volume thereof is about 200 μL to about 8500 μL.

The small diameter region is cylindrical, the small diameter is, for example, 1 mm to 3 mm and preferably, for example, 1.5 mm, and the length (d3) of the thin shaft portion in the axial direction is, for example, 3 mm to 30 mm and preferably 15.3 mm, and therefore the volume thereof is about 2 μL to about 200 μL. As described later, if this amount corresponds to a threshold value, the minute amount is equal to or less than this volume. Preferably, for example, the minute amount is about 26.5 μL or less. In this case, the large amount is, for example, about 27 μL to about 2000 μL. A material of the dispensing cylinder is glass, metal, resin, or the like, and examples thereof include polystyrene, polyester, and polypropylene (P.P).

As an example of limiting of a portion having the sealing function limited to the annual portion having the shortened length in the axial direction, as described above, for example, it is preferable that an airtight seal member (for example, O-ring, D-ring, X packing, or Y packing) is provided so as to surround the axis in a peripheral direction in either one of the inner peripheral surface of the large diameter region and the outer peripheral surface of the thick shaft portion to maintain airtightness (hence watertightness) and that the airtight seal member is provided so as to surround the axis in a peripheral direction in either one of the inner peripheral surface of the small diameter region and the outer peripheral surface of the thin shaft portion to maintain airtightness. Here, the "O-ring", "D-ring", "X packing", and "Y packing" are ring-shaped members having O-shaped, D-shaped, X-shaped, and Y-shaped cross-sections, respectively, made of an elastic material, metal, or the like, and used for sealing gas or liquid, and provided in grooves formed on an inner peripheral surface or an outer peripheral surface in a peripheral direction (particularly in cases of O-ring and D-ring) or provided in a portion without grooves. In a case where the "O-ring", "D-ring", "X packing", and "Y packing" are provided on an inner peripheral surface, the "O-ring", "D-ring", "X packing", and "Y packing" are provided so as to generate compressive force in a radial direction. In a case where the "O-ring", "D-ring", "X packing", and "Y packing" are provided on an outer peripheral surface of a column, the "O-ring", "D-ring", "X packing", and "Y packing" are provided so as to generate expansion force in a radial direction.

At the upper end of the small diameter region, at least one step projecting inward or a tapered inclined surface is formed toward a distal end of the nozzle on an inner wall surface of the cavity so as to partition the inner wall surface. In this case, the thick shaft portion is formed so as to come into close contact with a step or an inclined surface provided at the upper end of the small diameter region at a lowermost end of a plunger, and the entire thin shaft portion is preferably inserted into the small diameter region at this position.

In the present aspect of the invention, when the plunger is raised in the axial direction from a position where the thick shaft portion of the plunger is at the bottom dead center by a distance d (0≤d≤d3, d3: the length of the thin shaft portion in the axial direction and the length of a portion passing in the small diameter region while sliding), the thick shaft portion moves and rises in the floating region, and the thin shaft portion also slides by the same distance (d) in the small diameter region and rises. During the movement, the thin shaft portion maintains a state in which communication between the small diameter region and the large diameter region is blocked. Therefore, gas sucked from the nozzle stays in the small diameter region. Therefore, into the dispensing tip attached to the nozzle, a minute amount of liquid corresponding to the dispensing tip flows. When the plunger is lowered from this position by the d (≤d3) and returned to a bottom dead center, the sucked gas is discharged from the nozzle, and a minute amount of liquid sucked into the dispensing tip attached to the nozzle flows out. This is a reason why a minute amount of liquid can be sucked and discharged.

Meanwhile, when the plunger is raised in the axial direction by a distance d from the bottom dead center of the thick shaft portion of the plunger beyond the position of the length (d3) of the thin shaft portion in the axial direction such that d satisfies d3<d≤D<D0−d1−r0, the thin shaft portion is withdrawn from the small diameter region, blocking between the large diameter region and the small diameter region by the thin shaft portion is released, the small diameter region and the large diameter region communicate with each other, the gas sucked from the nozzle into the large diameter region reaches the large diameter region, and a large amount of liquid flows into the dispensing tip attached to the nozzle. When the plunger is lowered to the bottom dead center after reaching the position d=D, gas corresponding to (D−d3)×S1 is discharged from the nozzle through the small diameter region, and a large amount of liquid can be sucked and discharged (in a case of FIG. 2).

Therefore, a portion from the bottom dead center of the plunger to the length (d3) position of the thin shaft portion in the axial direction is the minute amount suction and discharge section. A position coordinate section from the bottom dead center of the plunger from the length (d3) position of the thin shaft portion to the stroke (D) is the large amount suction and discharge section.

In order to drive the dispensing cylinder, a stepping motor or the like is used as a driving source. During use, the plunger is reciprocated in the axial direction using, for example, a stepping motor. Switching between the large amount suction and discharge section and the minute amount suction and discharge section of the dispensing cylinder is performed by switching a stroke of the stepping motor. Incidentally, a rod formed thinner than the thick shaft portion is provided in the thick shaft portion so as to extend in the axial direction on the side opposite to the nozzle and to protrude outward from a rod hole formed at the end of the cylinder opposite to the nozzle. The rod is connected so as to be able to reciprocate with a stroke designated by the stepping motor. The rod is provided so as to slide with the rod hole in order to keep airtightness of the cavity.

A second aspect of the present invention is the dispensing cylinder in which the cavity has the floating region, in which the thick shaft portion is floatable in the axial direction, between the large diameter region and the small diameter region.

Here, the "floating region" is a region not sealed with the thick shaft portion (hence also with the thin shaft portion), for example, an entire peripheral non-sliding region having an inner peripheral surface which does not slide over the entire periphery, and is a maximum diameter region having an inner peripheral surface having an inner diameter with a maximum diameter larger than the large diameter or a partial non-sliding region, for example, a region in which grooves in the axial direction are formed on an inner peripheral surface of the region. That is, the airtight seal member does not function in this region. Incidentally, in a case where the plunger is provided such that the axial center of the plunger is maintained by a cylinder container or the like, it is unnecessary to provide the floating region concentric with the large diameter region and the small diameter region. Note that "being floatable" means being able to move with a resistance sufficiently smaller than a resistance received by the thin shaft portion sliding in the small diameter region.

Therefore, before (or after) the thick shaft portion slides in the large diameter region, when the thin shaft portion slides in the small diameter region, the thick shaft portion moves in the floating region in the axial direction. As a result, it is possible to avoid sliding between the thick shaft portion and the inner peripheral surface of the large diameter region while the thin shaft portion slides in the small diameter region, to prevent an increase in driving force to the plunger due to vacuuming in a region surrounded by the large diameter region, the thick shaft portion, and the thin shaft portion, and to achieve smooth driving of the plunger. In addition, wear and friction due to sliding between the thick shaft portion and the inner peripheral surface of the large diameter region can be avoided to extend the life of a component.

In this case, at a boundary between the large diameter region and the maximum diameter region, at least one step projecting outward or a reversely tapered inclined surface is formed toward the distal end of the nozzle on the inner wall surface of the cavity so as to partition the inner wall surface. In this case, the thick shaft portion is formed so as to come into close contact with a step or an inclined surface provided between the maximum diameter region and the small diameter region at the bottom dead center of the plunger, or is formed away from the boundary with the small diameter region by the distance ($r_0$), and the entire thin shaft portion is inserted into the small diameter region at this position as described above.

A third aspect of the present invention is the dispensing cylinder in which an airtight seal member is provided so as to surround the axis in a peripheral direction of the inner peripheral surface of the large diameter region or the outer peripheral surface of the thick shaft portion, another airtight seal member is provided so as to surround the axis in a peripheral direction of the inner peripheral surface of the small diameter region or the outer peripheral surface of the thin shaft portion, and the length of the floating region is determined based on at least positions at which the airtight seal members are provided.

Therefore, the airtight seal members are (1) provided in the thin shaft portion and the thick shaft portion, (2) provided in the small diameter region and the thick shaft portion, (3) provided in the thin shaft portion and the large diameter region, or (4) provided in the small diameter region and the large diameter region.

In the case of (1), if the width of the airtight seal member is ignored, the length ($d_0$) of the floating region in the axial direction is equal to or longer than the sum of the length ($d_1$) from the distal end surface of the thick shaft portion to a sealing position of the airtight seal member of the thick shaft portion in the axial direction and the length ($d_3'$) from the distal end surface of the thick shaft portion to a sealing position of the airtight seal member of the thin shaft portion in the axial direction. That is, $d_0 \geq d_1 + d_3'$ is satisfied.

In the case of (2), the length ($d_0$) of the floating region in the axial direction satisfies $d_0 + d_5 \geq d_1 + d_3$ if a distance from a lower end of the floating region to a sealing position of the airtight seal member in the small diameter region is represented by $d_5$, a length of a sliding portion of the thin shaft portion in the axial direction is represented by $d_3$, and a distance from the distal end surface of the thick shaft portion to a sealing position of the airtight seal member is represented by $d_1$. Incidentally, in FIG. 2 or 4, if it is assumed that $d_5 = 0$ is satisfied approximately, $d_0 = d_1 + d_3$ is almost satisfied.

In the case of (3), the length ($d_0$) of the floating region in the axial direction satisfies $d_0 + d_6 \geq d_1' + d_3'$ if a distance from an upper end of the floating region to a sealing position of the airtight seal member in the large diameter region is represented by $d_6$, a length of a sliding portion of the thick shaft portion in the axial direction is represented by $d_1'$, and a distance from the distal end surface of the thick shaft portion to a sealing position of the airtight seal member of the thin shaft portion is represented by $d_3'$.

In the case of (4), the length ($d_0$) of the floating region in the axial direction satisfies $d_0 + d_5 + d_6 \geq d_1' + d_3$ if a distance from the upper end of the floating region to a sealing position of the airtight seal member in the large diameter region is represented by $d_6$, a distance from a lower end of the floating region to a sealing position of the airtight seal member in the small diameter region is represented by $d_5$, a length of a sliding portion of the thick shaft portion in the axial direction is represented by $d_1'$, and a length of a sliding portion of the thin shaft portion in the axial direction is represented by $d_3$. Incidentally, in the above description, $r_0 = 0$ is satisfied. In a case of $r_0 \neq 0$, $r_0$ is added to the right side of each inequality.

A fourth aspect of the present invention is the dispensing cylinder further including a guide portion connected to the thin shaft portion of the plunger so as to protrude from the distal end of the thin shaft portion in the axial direction, provided so as to be slidable in the small diameter region, and having a ventilation passage therein, in which the ventilation passage or a part thereof is provided in an axial direction of the guide portion, and the sum of the lengths of the thin shaft portion and the ventilation passage in the axial direction is longer than the stroke of the thick shaft portion.

The "guide portion" is a member for guiding the thin shaft portion such that the thin shaft portion can be smoothly inserted into the small diameter region. Particularly, the guide portion is provided in order to reduce a load on an airtight seal member such as an O-ring or a load on the thin shaft portion due to inserting the thin shaft portion into the small diameter region. Therefore, the guide portion has such a structure that presence of the guide portion in the small diameter region does not block ventilation in the small diameter region. That is, the guide portion does not have a sealing function. The guide portion is preferably formed continuously or integrally with the thin shaft portion.

Here, the guide portion has the same outer diameter as the thin shaft portion, in other words, is a rod-shaped member provided so as to be slidable in the small diameter region. The ventilation passage is a hollow portion formed so as to penetrate the inside of the rod-shaped member and a lateral hole penetrating the inside of the rod-shaped member in a lateral direction so as to communicate with the hollow portion near the distal end of the thin shaft portion. Alternatively, the guide portion is a rod-shaped member having the same outer diameter as the thin shaft portion, and the ventilation passage is a groove formed by engraving a surface of the rod-shaped member in the axial direction over the entire length of the rod-shaped member. Alternatively, the guide portion is formed, for example, by arranging a plurality of rods each having a sufficiently smaller cross section than the cross section of the small diameter region in a columnar shape with a gap therebetween so as to be slidable. The ventilation passage is a gap between the plurality of rods. Furthermore, the guide portion is a hollow pipe having the same outer diameter as the thin shaft portion, on which one or two or more slits extending over the entire length of the guide portion are formed on a side surface in the axial direction.

Here, if the stroke of the thick shaft portion is represented by D, the sum of the lengths of the small diameter region and the through hole in the axial direction is represented by $d2$, the length of the thin shaft portion in the axial direction is represented by $d3$, and the length of the ventilation passage of the guide portion in the axial direction is represented by $d4$, a distal end of the guide portion should not protrude from a distal end of a nozzle. Therefore, the sum ($d3+d4$) of the lengths of the thin shaft portion and the ventilation passage of the guide portion in the axial direction needs to be smaller than the sum ($d2$) of the lengths of the small diameter region and the through hole in the axial direction. Therefore, $d3+d4<d2$ is satisfied. Meanwhile, the sum ($d3+d4$) of the lengths of the thin shaft portion and the ventilation passage of the guide portion in the axial direction needs to be larger than the stroke (D). Therefore, $d3+d4>D$ is satisfied. In addition, the length $d3$ of the thin shaft portion in the axial direction needs to be smaller than the stroke (D), of course. Therefore, $d3+d4>D$ is satisfied. Note that the length from the distal end of the thick shaft portion to the distal end of the guide portion in the axial direction is $r0+d3+d4$.

In summary, the following relational formula is obtained. That is, in a case of $d4 \neq 0, d2 > r0+d3+d4, d3+d4 > D > d3$, and $D0-r0-d1 \geq D > d3$, and in a case of $d4=0, d2 > r0+d3$ and $D0-r0-d1 \geq D > d3$.

In the present aspect of the invention, regarding raising or lowering the plunger in the axial direction from a position where the thick shaft portion of the plunger is located at a bottom dead center by a distance d ($0 \leq d \leq d3$, $d3$: length of the thin shaft portion in the axial direction), that is, regarding inflow and outflow of a minute amount of liquid, there is no particularly large difference in operation from the above-described invention.

Meanwhile, when the plunger is raised in the axial direction by a distance d of the thick shaft portion of the plunger ($D0-r0-d1 \geq D \geq d > d3$) beyond the position of the length ($d3$) of the thin shaft portion in the axial direction, the thin shaft portion is withdrawn from the small diameter region. However, the guide portion stays in the small diameter region, the small diameter region and the large diameter region communicate with each other via the ventilation passage of the guide portion, the gas sucked from the nozzle into the large diameter region reaches the large diameter region, and a large amount of liquid flows into the dispensing tip attached to the nozzle.

When the plunger is lowered from this position by the stroke D, the sucked gas corresponding to the large diameter region and the small diameter region is discharged from the nozzle, and the thin shaft portion is again inserted into the small diameter region at a position where the distance d is the length $d3$ of the thin shaft portion in the axial direction. However, since the guide portion stays in the small diameter region, insertion and sliding of the thin shaft portion into the small diameter region are performed smoothly. Particularly in a case where an airtight seal member such as an O-ring is provided at the upper end of the small diameter region, insertion and sliding are performed smoothly without applying a large load to the airtight seal member.

A fifth aspect of the present invention is the dispensing cylinder in which the ventilation passage has a ventilation hole penetrating an inside of the guide portion so as to have a longitudinal hole formed at the distal end of the guide portion as one end and to have a lateral hole formed in a side surface of the guide portion adjacent to the thin shaft portion as the other end.

Here, the "longitudinal hole" is an opening formed near the one end in the axial direction, and the "lateral hole" is an opening formed near the other end in a direction perpendicular to the axial direction. Therefore, for example, the guide portion is a hollow cylindrical body having one end connected to the distal end of the thin shaft portion and closed and having the other end opened, and has a lateral hole formed in a side surface adjacent to the thin shaft portion.

A sixth aspect of the present invention is the dispensing cylinder in which the length of a portion of the plunger protruding from the distal end of the thick shaft portion to reach the thin shaft portion in the axial direction is equal to a distance from the bottom dead center of the thick shaft portion to a boundary with the small diameter region in the axial direction.

As described above, the length $d3$ of the thin shaft portion in the axial direction is a maximum length of a portion having a sealing function and capable of sliding and passing in the small diameter region when a minute amount of liquid is sucked and discharged, measured from a distal end surface side of the thick shaft portion. Therefore, a portion which is not inserted into the small diameter region and does not pass therethrough is not referred to as the thin shaft portion. Therefore, the portion of the plunger (rod) is a portion which does not slide with the small diameter region at that time, and cannot be referred to as the thin shaft portion. Since the length of the portion is represented by "r0" as described above, the length from the distal end of the thick shaft portion to the distal end of the thin shaft portion in the axial direction is $r0+d3$. In this case, $r0+d3<d2$ is preferably satisfied as described above.

A seventh aspect of the present invention is a dispensing device using a dispensing cylinder, including: a container group including a liquid-storing unit capable of storing various reagents and specimens and a tip-storing unit for storing a dispensing tip; one or more of the dispensing cylinders according to the first aspect of the present invention; one or more of the dispensing tips detachably attached to respective one or more of the nozzles of the one or more dispensing cylinders; a dispensing head including a nozzle arrangement unit in which the one or more nozzles of the one or more dispensing cylinders are arranged and a suction/discharge driving unit for moving the respective one or more of the plungers of the one or more dispensing cylinders in a vertical direction and sucking and discharging liquid with respect to the dispensing tips; a nozzle moving mechanism capable of moving the nozzles relatively to the container group; and a minute amount/large amount judgement and instruction unit for judging, in a case where an instruction to suck and discharge a predetermined amount of liquid is made to the dispensing tips, whether the predetermined amount is a minute amount or a large amount, instructing the suction/discharge driving unit to locate the thin shaft portion of the plunger of each of the dispensing cylinders in a minute amount suction and discharge section in which the thin shaft portion is slidable in the small diameter region, to slide the thin shaft portion by a distance corresponding to the predetermined amount in a case where the judgment result is a minute amount, and instructing the suction/discharge driving unit to locate the thick shaft portion of the plunger in a large amount suction and discharge section in which the thick shaft portion is slidable in the large diameter region, to slide the thick shaft portion by a distance corresponding to the predetermined amount in a case where the judgment result is a large amount.

Here, the phrase "judging whether the predetermined amount is a minute amount or a large amount" means, for example, judging the predetermined amount to be a minute amount in a case where the predetermined amount is smaller than a threshold value, and judging the predetermined amount to be a large amount in a case where the predetermined amount is larger than the threshold value. The threshold value is a maximum minute amount determined by the length d3 of the thin shaft portion in the minute amount suction and discharge section and the cross-sectional area thereof S2, that is, d3×S2. Alternatively, the predetermined amount is judged to be a minute amount in a case where the predetermined amount is smaller than a threshold value, and judged to be a large amount in a case where the predetermined amount is larger than the threshold value, for example, 1×S1, which is assumed by that 1 mm or more of a distance from the bottom dead center at S1 of the cross-sectional area of the large diameter region in the large amount suction enables an easy treatment.

The minute amount/large amount judgement and instruction unit includes, for example, a communication function such as CPU, ROM, RAM, various external memories, or LAN, and CPU+program+memory including a program or the like stored in ROM or the like.

The dispensing tip is preferably attached in a state where the dispensing tip can be attached to the nozzle, that is, by storing the dispensing tip in a tip-storing unit while an attachment opening formed at an upper end of a thick pipe of the dispensing tip is on an upper side and an opening of a thin pipe is on a lower side, and lowering the nozzle by the nozzle moving mechanism. Note that the nozzle moving mechanism preferably includes a dispensing head moving mechanism for relatively moving the dispensing head for example, along a Y-axis and a nozzle moving mechanism for moving the nozzle provided in the dispensing head for example, in a Z-axis direction. Here, the term "relative" indicates that a relative relation is satisfied in a relation to another object to be compared. Therefore, a case of "relatively moving" may include a case where one object (for example, a nozzle) moves and the other object (for example, a container group) is stationary, a case where one object is stationary and the other object moves, and a case where both objects move (a case where the objects move at different speeds).

An eighth aspect of the present invention is the dispensing device using the dispensing cylinder, in which the cavity of the dispensing cylinder has a floating region, in which the thick shaft portion is floatable in the axial direction, between the large diameter region and the small diameter region.

A ninth aspect of the present invention is the dispensing device using the dispensing cylinder, in which an airtight seal member is provided so as to surround an axis in a peripheral direction of the inner peripheral surface of the large diameter region or the outer peripheral surface of the thick shaft portion, another airtight seal member is provided so as to surround the axis in a peripheral direction of the inner peripheral surface of the small diameter region or the outer peripheral surface of the thin shaft portion, and the length of the floating region is determined based on at least positions at which the airtight seal members are provided.

A tenth aspect of the present invention is the dispensing device using the dispensing cylinder, further including a guide portion connected to the thin shaft portion of the plunger of the dispensing cylinder so as to protrude from the distal end of the thin shaft portion in the axial direction, provided so as to be slidable in the small diameter region, and having a ventilation passage therein, in which the ventilation passage or a part thereof is provided in the axial direction of the guide portion, and the sum of the lengths of the thin shaft portion and the ventilation passage in the axial direction is longer than the stroke of the thick shaft portion.

An eleventh aspect of the present invention is the dispensing device using the dispensing cylinder, in which the length of a portion of the plunger protruding from the distal end of the thick shaft portion of the plunger to reach the thin shaft portion in the axial direction corresponds to a distance from the bottom dead center of the thick shaft portion to a boundary with the small diameter region in the axial direction, the suction/discharge driving unit can lower the plunger of the dispensing cylinder below the bottom dead center of the thick shaft portion, and the dispensing device further includes a tip detaching mechanism for making the dispensing tip attached to the nozzle of the dispensing cylinder detachable due to lowering of the plunger.

Here, as described above, the length from the distal end of the thick shaft portion to the thin shaft portion in the axial direction is "r0". As described above, this "r0" preferably has a length corresponding to the length of the nozzle in the axial direction in a case of use for the tip detaching mechanism. The bottom dead center is a lower limit position of the stroke of the plunger for sucking and discharging liquid, and the plunger is further lowered for detaching a tip. As the tip detaching mechanism, a tip detaching member that can be lowered by the suction and discharge driving unit is provided outside the dispensing cylinder. The tip detaching member is, for example, a plate-shaped member in which one or more holes each having an inner diameter larger than the outer diameter of the nozzle but smaller than the maximum outer diameter of the dispensing tip attached to the nozzle penetrate the nozzle and which is elastically urged upward so as to be able to be lowered by the suction and discharge driving unit below the bottom dead center of the plunger to be movable downward and returnable to an original position.

A twelfth aspect of the present invention is a dispensing treatment method using a dispensing cylinder, including: a judgement step of judging, in a case where an instruction to suck or discharge a predetermined amount of liquid is made to the dispensing tip, whether the predetermined amount is a minute amount or a large amount; an attachment step of attaching a dispensing tip to the nozzle of the dispensing cylinder according to the first aspect of the present invention; a minute amount suction and discharge step of sucking and discharging the minute amount of liquid to the dispensing tip by locating the thin shaft portion of the plunger of the dispensing cylinder in the minute amount suction and discharge section in which the thin shaft portion is slidable in the small diameter region, to slide the thin shaft portion by a distance corresponding to the predetermined amount in a case where the predetermined amount is judged to be a minute amount; and a large amount suction and discharge step of sucking and discharging the large amount of liquid to the dispensing tip by locating the thick shaft portion of the plunger in the large amount suction and discharge section in which the thick shaft portion is slidable in the large diameter region, to slide the thick shaft portion by a distance corresponding to the predetermined amount in a case where the predetermined amount is judged to be a large amount.

Here, in a case where the dispensing tip includes a dispensing tip for a large amount and a dispensing tip for a minute amount, a corresponding dispensing tip is attached based on the judgement result.

A thirteenth aspect of the present invention is the dispensing treatment method using the dispensing cylinder, in which the cavity of the dispensing cylinder has the floating region, in which the thick shaft portion is floatable in the axial direction, between the large diameter region and the small diameter region, and the thick shaft portion moves in the floating region in the minute amount suction and discharge step.

Incidentally, in this case, as described above, the airtight seal member is provided so as to surround the axis in the peripheral direction of the inner peripheral surface of the large diameter region or the outer peripheral surface of the thick shaft portion, the airtight seal member is provided so as to surround the axis in the peripheral direction of the inner peripheral surface of the small diameter region or the outer peripheral surface of the thin shaft portion, and the length of the floating region is determined based on at least positions at which the airtight seal members are provided.

A fourteenth aspect of the present invention is the dispensing treatment method using the dispensing cylinder, in which the dispensing cylinder further includes a guide portion connected to the thin shaft portion of the plunger of the dispensing cylinder, so as to protrude from the distal end of the thin shaft portion in the axial direction, provided so as to be slidable in the small diameter region, and having a ventilation passage therein, and the ventilation passage or a part thereof is provided in the axial direction of the guide portion, the sum of the lengths of the thin shaft portion and the ventilation passage in the axial direction is longer than the stroke of the thick shaft portion, and the guide portion slides in the small diameter region in the large amount suction and discharge step.

A fifteenth aspect of the present invention is the dispensing treatment method using the dispensing cylinder, in which the length of a portion of the plunger protruding from the distal end of the thick shaft portion of the plunger to reach the thin shaft portion in the axial direction corresponds to a distance from the bottom dead center of the thick shaft portion to a boundary with the small diameter region in the axial direction, and the method further includes a tip detaching step of detaching a dispensing tip attached to the nozzle of the dispensing cylinder by lowering the thick shaft portion of the plunger of the dispensing cylinder below the bottom dead center.

Advantageous Effects of Invention

According to the first, seventh, or twelfth aspect of the present invention, it is possible to switch between suction and discharge of a minute amount of gas and suction discharge of a large amount of gas by movement of the plunger in the axial direction. This makes it possible to use a plunger having an inner diameter and an outer diameter and a cylinder region suitable for suction and discharge in each of a minute amount and a large amount, and it is possible to perform a highly accurate dispensing treatment in each of a large amount and a minute amount with high reliability.

It is possible to suck and discharge a minute amount of liquid using the single dispensing cylinder and also to suck and discharge a large amount of liquid. Therefore, it is unnecessary to prepare a plurality of types of dispensing cylinders corresponding to the amount of liquid, and it is possible to prevent expansion of a device scale and an increase of manufacturing cost.

By fixing the thick shaft portion and the thin shaft portion having two different outer diameters to the same plunger and providing the large diameter region and the small diameter region having two different inner diameters in the same cylinder, it is possible to provide a dispensing cylinder which makes relative movement between the thick shaft portion and the thin shaft portion impossible, simplifies the structure and operation of the dispensing cylinder, and can be manufactured inexpensively.

According to the second, eighth, or thirteenth aspect of the present invention, by providing the floating region of the thick shaft portion between the large diameter region and the small diameter region, the thick shaft portion moves in the floating region while the thin shaft portion slides in the small diameter region in an airtight state, and driving force of the plunger is thereby reduced when a minute amount is sucked and discharged. Particularly, it is possible to prevent the increase in driving force necessary for driving the plunger by vacuuming the region surrounded by the thick shaft portion, the large diameter region, and the thin shaft portion to drive the plunger smoothly.

According to the third or ninth aspect of the present invention, by providing the airtight seal member on the inner peripheral surface of the large diameter region or the outer peripheral surface of the thick shaft portion, providing the other airtight seal member on the inner peripheral surface of the small diameter region or the outer peripheral surface of the thin shaft portion, and setting the length of the floating region based on the positions where the airtight seal members are provided, it is possible to suck or discharge a minute amount smoothly with high efficiency by providing the floating region while ensuring airtightness between the large diameter region and the thick shaft portion and between the small diameter region and the thin shaft portion. In addition, by shortening the length of the airtight seal member in the axial direction, smoother operation can be performed.

According to the fourth, fifth, tenth, or fourteenth aspect of the present invention, when a large amount is sucked, when the thick shaft portion is sliding in the large diameter region, the guide portion slides in the small diameter region although the thin shaft portion is withdrawn from the small diameter region. As a result, when a large amount is discharged, the thin shaft portion is again inserted into the small diameter region smoothly, a load on the airtight seal member such as an O-ring can be reduced, the life of a component can be extended, and a highly reliable suction and discharge treatment can be performed.

According to the sixth, eleventh, or fifteenth aspect of the present invention, setting is performed such that the length of the portion of the plunger protruding from the distal end of the thick shaft portion to reach the thin shaft portion in the axial direction corresponds to the distance from the bottom dead center of the thick shaft portion to the boundary with the small diameter region in the axial direction, and the portion of the plunger is slidable or floatable in the small diameter region. As a result, the thick shaft portion of the plunger can be lowered below the bottom dead center. In this case, by using the driving mechanism of the plunger, the dispensing tip attached to the nozzle can be detached together with suction and discharge of a large amount and a small amount of liquid. This makes it possible to use one structure for a plurality of functions, to prevent expansion of a device scale, and to provide an inexpensive device having a simple structure although various functions are integrated.

DESCRIPTION OF EMBODIMENTS

Figure 1:
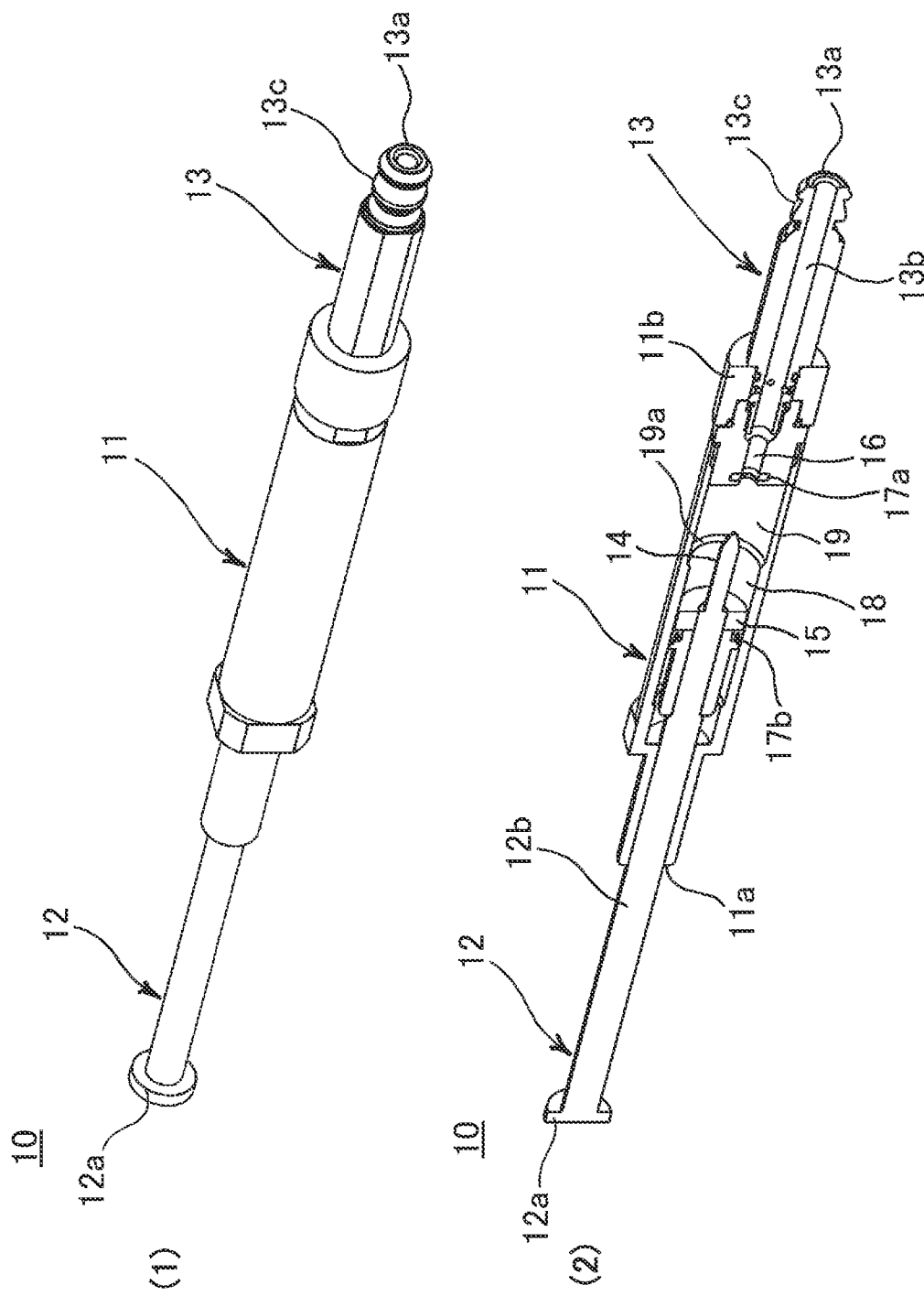
FIG. 1 is a perspective view illustrating a dispensing cylinder according to a first embodiment of the present invention and a cross-sectional perspective view illustrating the inside thereof, obtained by cutting the dispensing cylinder.

Subsequently, embodiments of the present invention will be described with reference to the drawings. Note that the embodiments should not be construed as limiting the present invention unless otherwise specified. In the embodiments or embodiment examples, the same reference numeral is used to denote the same part, and descripLion thereof is omitted.

A dispensing cylinder 10 according to a first embodiment of the present invention will be described with reference to FIGS. 1 and 2.

The dispensing cylinder 10 according to the present embodiment includes: a nozzle 13 provided at one end of a cylinder 11 having a cavity (18, 19, 16) therein, having a nozzle suction/discharge port 13a at a distal end thereof, having a through hole 13b communicating with the cavity (18, 19, 16) and extending in the axial direction of the cavity, and having an attachment portion 13c capable of attaching a dispensing tip (211, 212) to the outside thereof; and a plunger 12 provided so as to be slidable in the cavity (18, 19, 16) in the axial direction and having a flange 12a to be connected to a driving unit such as a stepping motor at an outer side end portion of the cylinder 11. The nozzle 13 is formed separately from the cylinder 11 and attached to the one end via a connecting portion 11b.

The cavity (16, 18, 19) has a large diameter region 18 having a large diameter inner peripheral surface and a small diameter region 16 provided on the side of the nozzle 13 with respect to the large diameter region and having a small diameter inner peripheral surface. Here, in the present embodiment, the inner diameter of the through hole 13b is larger than the inner diameter of the small diameter region 16, but smaller than the inner diameter of the large diameter region 18.

The plunger 12 includes: a rod 12b penetrating an opening 11a provided at the other end of the cylinder 11 and provided in the cavity (16, 18, 19) of the cylinder 11 in the axial direction; a thick shaft portion 15 provided coaxially with the rod 12b, formed in a columnar shape having an outer diameter larger than the outer diameter of the rod 12b, and provided so as to be slidable in the large diameter region 18; and a thin shaft portion 14 protruding from a distal end surface of the thick shaft portion 15 or the rod 12b in the axial direction and provided so as to be slidable in the small diameter region 16. A length (d3) of the thin shaft portion 14 in the axial direction is shorter than the stroke (D) of the thick shaft portion 15.

Furthermore, in the dispensing cylinder 10 according to the present embodiment, an O-ring 17a as an airtight seal member is provided so as to surround an axis in a peripheral direction on an inner peripheral surface of an upper end portion (the position is almost d5=0) of the small diameter region 16, and an O-ring 17b as another airtight seal member is provided so as to surround the axis in a peripheral direction on an outer peripheral surface of the thick shaft portion 15 in the thick shaft portion 15 (a distance to the airtight seal member is d1).

Furthermore, in the dispensing cylinder 10 according to the present embodiment, between the large diameter region 18 and the small diameter region 16, a floating region 19 in which the thick shaft portion 15 is floatable in the axial direction is provided coaxially with the large diameter region 18 and the small diameter region 16. A length (d0) of the floating region 19 is equal to or longer than the sum of the length (d3) of the thin shaft portion 14 in the axial direction and the length (d1) of the thick shaft portion. In the present embodiment, the floating region 19 has an inner peripheral surface on which the thick shaft portion 15 does not slide, and has an inner diameter with a maximum diameter larger than the large diameter. Therefore, on a boundary with the large diameter region 18, a reversely tapered inclined surface is formed toward the nozzle 13. On a boundary with the small diameter region 16, at least one step projecting inward is formed toward a distal end of the nozzle so as to partition an inner wall surface of the cavity.

Figure 2:
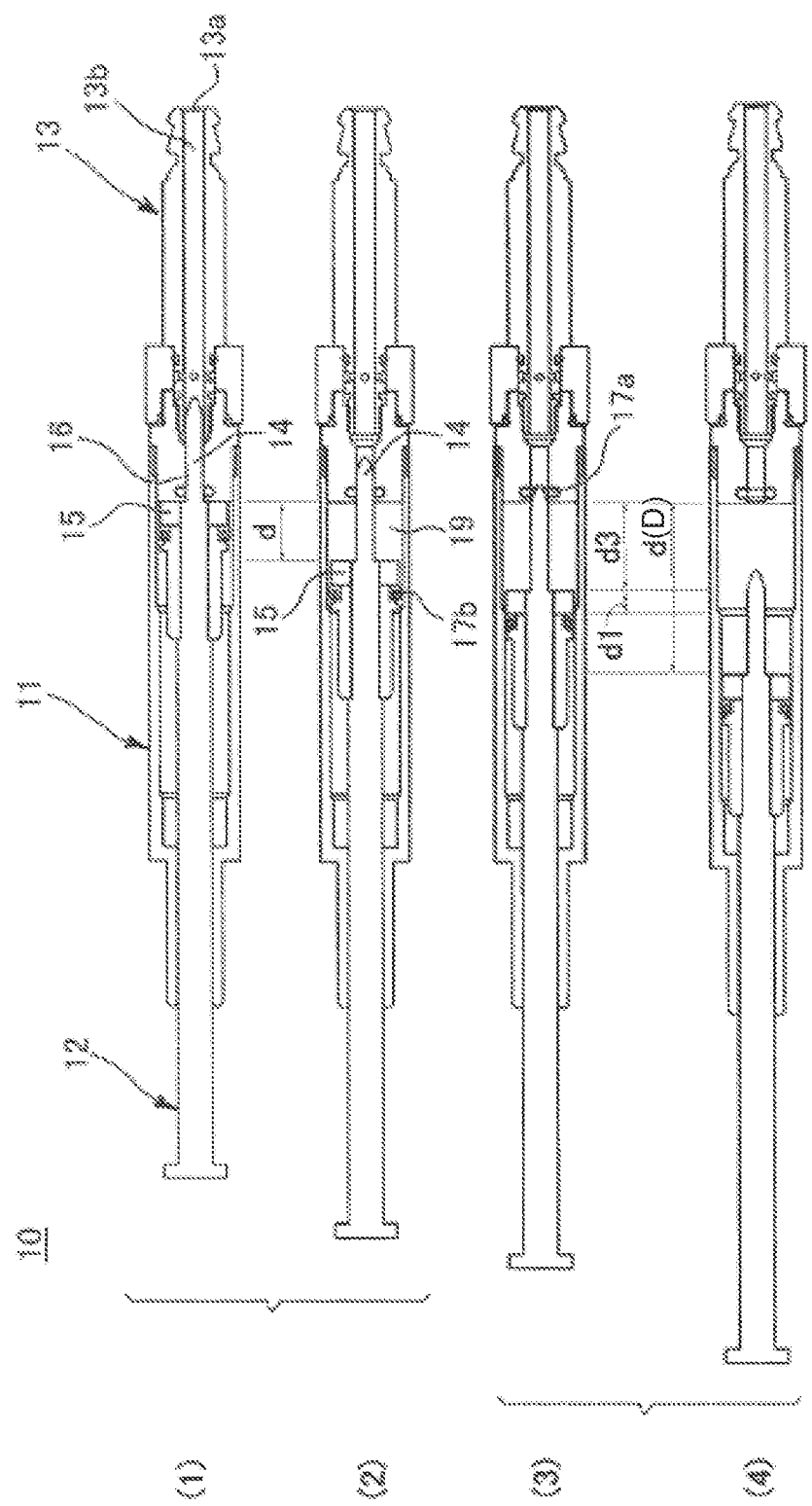
FIG. 2 is an operation explanatory view of the dispensing cylinder according to the first embodiment of the present invention.

FIG. 2 illustrates operation of the dispensing cylinder 10 according to the present embodiment. FIGS. 2(1) and 2(2) illustrate suction operation of a minute amount of liquid. In FIG. 2(1), the thick shaft portion 15 is located at a bottom dead center of the plunger 12 as a lowermost end of the floating region 19, that is, an upper end of the small diameter region 16. Therefore, the thin shaft portion 14 is inserted into the small diameter region 16. In this state, a distal end of a dispensing tip attached to the nozzle 13 is inserted into a container-storing liquid.

Note that the stroke of the thick shaft portion 15 is represented by D, a distance from the lowermost end of a distal end of the thick shaft portion 15 in the axial direction is represented by d, the length of the thin shaft portion 14 is represented by d3, and a distance from the distal end of the thick shaft portion 15 to the airtight seal member 17$b$ is represented by d1. Therefore, the length d0 of the floating region 19 is equal to or larger than d3+d1. If the sum of the lengths of the small diameter region and the through hole of the nozzle is represented by d2, as described above, 0≤d≤D, d3<d2, and d3<D are satisfied.

In FIG. 2(2), when the plunger 12 is raised from the bottom dead center by a distance d (<d3), the thin shaft portion 14 slides in the small diameter region 16 and rises by the distance d, the thick shaft portion 15 moves by d in the floating region 19, and liquid flows into the dispensing tip attached to the nozzle 13 in an amount of S2×d.

d<d3 in FIGS. 2(1) and 2(2) corresponds to the minute amount suction and discharge section.

In FIG. 2(3), when the plunger 12 is moved from the bottom dead center by a distance d=d3, the thin shaft portion 14 starts to be withdrawn from the small diameter region 16, the thick shaft portion 15 enters the large diameter region 18, and suction of gas passing through an opening 13$a$ of the nozzle 13 into the floating region 19 and the large diameter region 18 thereby starts.

In FIG. 2(4), when the plunger 12 is moved from the bottom dead center by a distance d (>d3), the thin shaft portion 14 moves in the floating region 19, then the thick shaft portion 15 slides in the large diameter region 18, and liquid is sucked into the dispensing tip attached to the nozzle 13 in an amount of S1×{d−(d0−d1)} generally (in the above case (2)), and in an amount of S1×(d−d3) in the case of FIG. 2. Here, S1 and S2 are cross-sectional areas of the large diameter region 18 and the small diameter region 16 cut perpendicularly to the axial direction, respectively.

Figure 3:
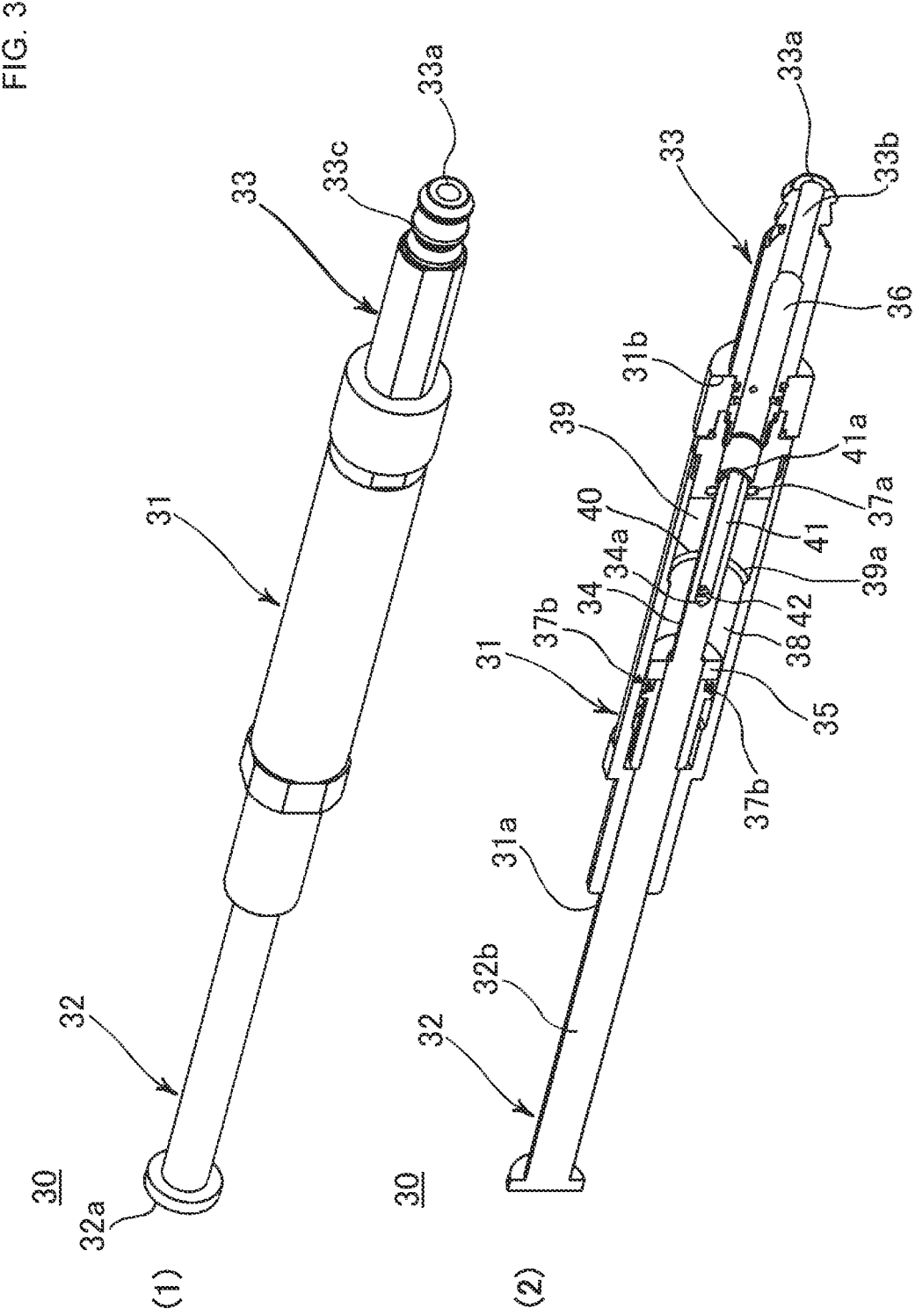
FIG. 3 is a perspective view illustrating a dispensing cylinder according to a second embodiment of the present invention and a cross-sectional perspective view illustrating the inside thereof, obtained by cutting the dispensing cylinder.

Subsequently, a dispensing cylinder 10 according to a second embodiment of the present invention will be described with reference to FIGS. 3 and 4.

The dispensing cylinder 30 according to the present embodiment includes: a nozzle 33 provided at one end of a cylinder 31 having a cavity (36, 38, 39) therein, having a nozzle suction/discharge port 33$a$ at a distal end thereof, having a through hole 33$b$ communicating with the cavity (36, 38, 39) and extending in the axial direction of the cavity, and having an attachment portion 33$c$ capable of attaching a dispensing tip (211, 212) to the outside thereof; and a plunger 32 provided so as to be slidable in the cavity (36, 38, 39) in the axial direction and having a flange 32$a$ to be connected to a driving unit such as a stepping motor at an outer side end portion of the cylinder 31. The nozzle 33 is formed separately from the cylinder 31 and attached to the one end via a connecting portion 31$b$.

The cavity (36, 38, 39) has a large diameter region 38 having a large diameter inner peripheral surface and a small diameter region 36 provided on the side of the nozzle 33 with respect to the large diameter region 38 and having a small diameter inner peripheral surface. Here, in the present embodiment, the inner diameter of the through hole 33$b$ is larger than the inner diameter of the small diameter region 36, but smaller than the inner diameter of the large diameter region 38.

The plunger 32 includes: a rod 32$b$ penetrating an opening 31$a$ provided at the other end of the cylinder 31 and provided in the axial direction of the cavity (36, 38, 39) of the cylinder 31; a thick shaft portion 35 provided coaxially with the rod 32$b$, formed in a columnar shape having an outer diameter larger than the outer diameter of the rod 32$b$, and provided so as to be slidable in the large diameter region 38; a thin shaft portion 34 protruding from a distal end surface of the thick shaft portion 35 or the rod 32$b$ in the axial direction and provided so as to be slidable in the small diameter region 36; and a guide portion 40 connected to the thin shaft portion 34 so as to protrude from a distal end of the thin shaft portion 34 in the axial direction, provided so as to be slidable in the small diameter region 36, and having a ventilation hole 41 and a lateral hole 42 formed therein as a ventilation passage.

The ventilation hole 41 extends in the guide portion 40 in the axial direction, has an opening 41$a$ having a lower end opened outward at a distal end of the guide portion 40, and has an upper end closed with a distal end edge of a distal end 34$a$ of the thin shaft portion. The lateral hole 42 has an opening communicating with the ventilation hole 41 at the upper end of the ventilation hole 41 and formed in a side surface of the guide portion 40. Here, the sum of a length d3 of the thin shaft portion 34 and a length d4 of the ventilation hole 41 as the ventilation passage in the axial direction is longer than the stroke D of the thick shaft portion 35.

That is, d3+d4>D is satisfied. Meanwhile, D>d3 is satisfied.

Furthermore, in the dispensing cylinder 30 according to the present embodiment, an O-ring 37$a$ as an airtight seal member is provided so as to surround an axis in a peripheral direction on an inner peripheral surface of an upper end portion of the small diameter region 36, and an O-ring 37$b$ as an airtight seal member is provided so as to surround the axis in a peripheral direction on an outer peripheral surface of the thick shaft portion 35 in the thick shaft portion 35.

Furthermore, in the dispensing cylinder 30 according to the present embodiment, between the large diameter region 38 and the small diameter region 36, a floating region 39 in which the thick shaft portion 35 is floatable in the axial direction is provided coaxially with the large diameter region 38 and the small diameter region 36. The floating region 39 has a length d0 in the axial direction, longer than the length d3 of the thin shaft portion 34 in the axial direction. Alternatively, in a case where the length d1 of the thick shaft portion 35 cannot be ignored, the floating region 39 has a length equal to or longer than d3+d1. In the present embodiment, the floating region 39 has an inner peripheral surface on which the thick shaft portion 35 does not slide, and has an inner diameter with a maximum diameter larger than the large diameter. Therefore, on a boundary with the large diameter region 38, a reversely tapered inclined surface is formed toward the nozzle 33. On a boundary with the small diameter region 36, at least one step projecting inward is formed toward a distal end of the nozzle so as to partition an inner wall surface of the cavity.

Figure 4:
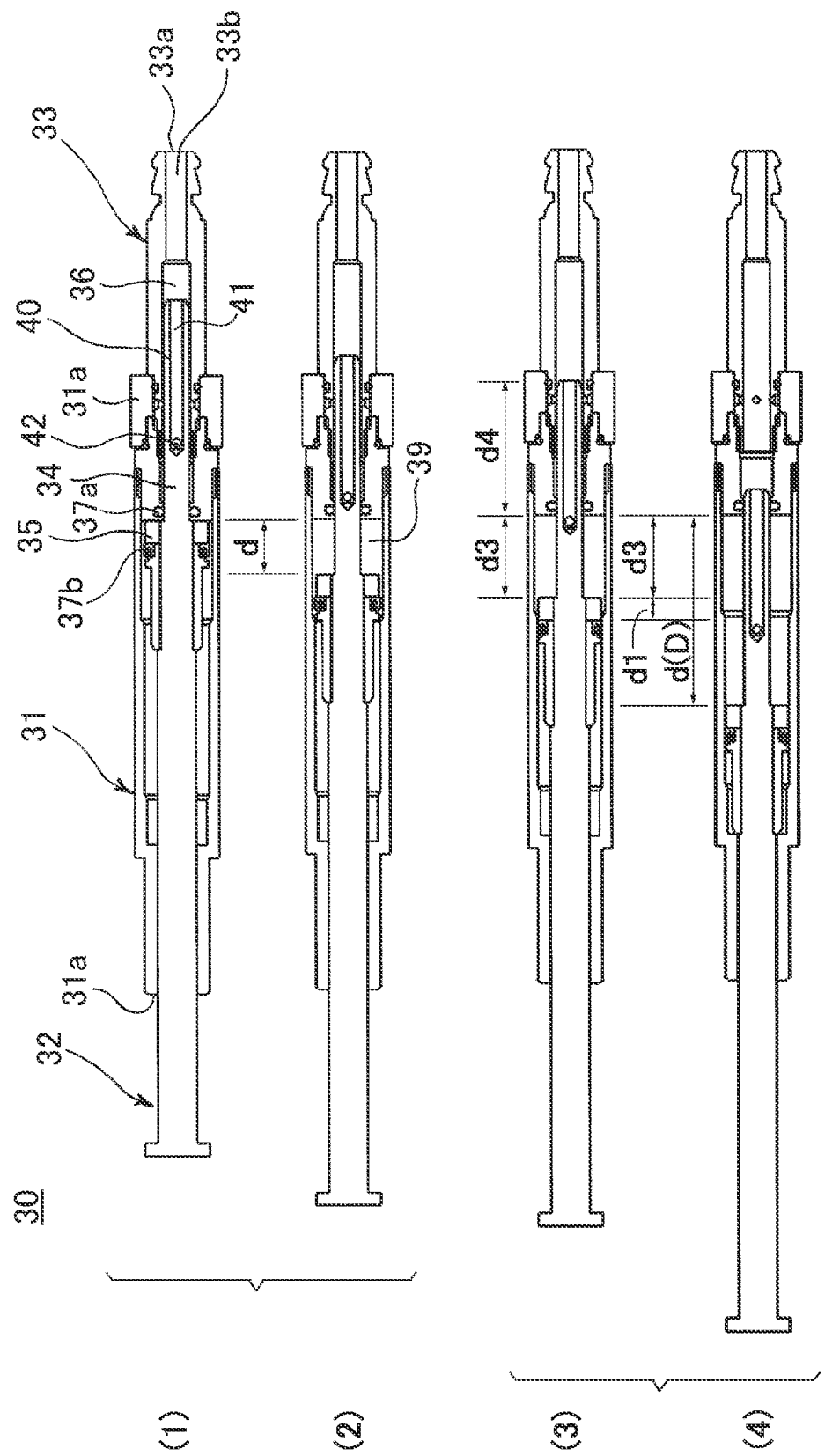
FIG. 4 is an operation explanatory view of the dispensing cylinder according to the second embodiment of the present invention.

FIG. 4 illustrates operation of the dispensing cylinder 30 according to the present embodiment. FIGS. 4(1) and 4(2) illustrate suction operation of a minute amount of liquid. In FIG. 4(1), the thick shaft portion 35 is located at a bottom dead center of a predetermined stroke of the plunger 32 as a lowermost end of the floating region 39, that is, an upper end of the small diameter region 36. Therefore, the thin shaft portion 34 and the guide portion 40 are inserted into the small diameter region 36. In this state, a distal end of a dispensing tip attached to the nozzle 33 is inserted into a container-storing liquid.

Incidentally, if the stroke of the thick shaft portion 35 is represented by D, a distance from a lowermost end of the thick shaft portion 35 in the axial direction is represented by d, the length of the thin shaft portion 34 is represented by d3, thus the length d0 of the floating region 19 is equal to or longer than r0+d3 or r0+d3+d1 (in a case where the length of d1 cannot be ignored), the sum of the lengths of the small diameter region and the through hole of the nozzle is represented by d2, and the length of the guide portion 40 is represented by d4, as described above, 0<d<D, d3+d4+r0<d2, d3<D, and d3+d4+r0>D are satisfied (provided that r0=0 is satisfied in the case of FIG. 4).

In FIG. 4(2), when the plunger 32 is raised from the bottom dead center by the distance d (<d3), the thin shaft portion 34 and the guide portion 40 slide in the small diameter region 36 and rise by the distance d, the thick shaft portion 35 moves by d in the floating region 39, and liquid flows into the dispensing tip attached to the nozzle 33 in an amount of S2×d.

d<d3 in FIGS. 4(1) and 4(2) corresponds to the minute amount suction and discharge section.

In FIG. 4(3), when the plunger 32 is moved by the distance d=d3 (<D) from the bottom dead center, the thin shaft portion 34 starts to be withdrawn from the small diameter region 36, the thick shaft portion 35 starts to be inserted into the large diameter region 38. However, the guide portion 40 is connected so as to protrude from a distal end of the thin shaft portion 34, and sliding continues while the guide portion 40 stays in the small diameter region 36. Therefore, the O-ring 37a as the airtight seal member provided in the small diameter region 36 maintains airtightness between a surface of the guide portion 40 and the O-ring 37a without being compressed by withdrawal of the thin shaft portion 34. However, communication between the small diameter region 36 and the through hole 33b of the nozzle 33 and the floating region 39 starts via the ventilation hole 41 and the lateral hole 42 as a ventilation passage provided in the guide portion 40. Suction of gas passing through the opening 33a of the nozzle 33 into the floating region 39 and the large diameter region 38 is disclosed.

In FIG. 4(4), when the plunger 32 is moved from the bottom dead center by a distance d (=D>d3), the thin shaft portion 34 and the guide portion 40 move in the floating region 39, the thick shaft portion 35 slides in the large diameter region 38, and liquid is sucked into the dispensing tip attached to the nozzle 33 in an amount of S1×{d−(d0−d1)}=S1×(D−d3). Here, S1 and S2 are cross-sectional areas cut perpendicularly to the axial direction of the large diameter region 38 and the small diameter region 36, respectively. (actually, S1 and S2 also depend on the shape of a distal end of the thick shaft portion or the thin shaft portion).

Figure 5:
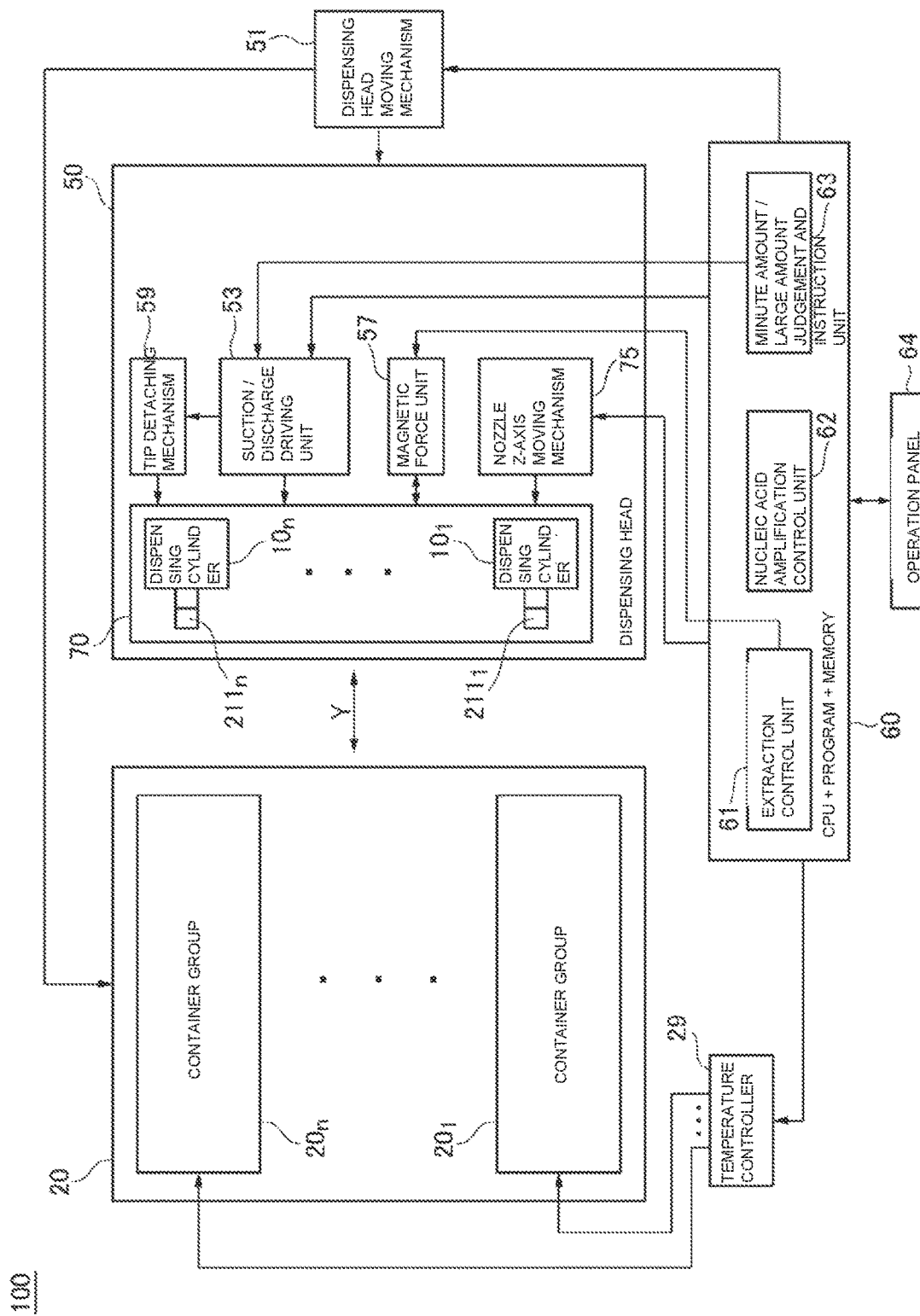
FIG. 5 is a block diagram illustrating a dispensing device according to the first or second embodiment of the present invention.

FIG. 5 illustrates a block diagram of a dispensing device 100 using the dispensing cylinders $10_1$ to $10_n$ according to the first embodiment of the present invention.

The dispensing device 100 roughly includes: a stage 20 in which a plurality of (n in this example, n≥1) container groups $20_i$ (i=1, . . . , n) is arranged; a nozzle arrangement unit 70 in which dispensing cylinders $10_i$ including a plurality of (n in this example) nozzles $13_i$ for detachably attaching dispensing tips $211_1$ to $211_n$ (for a minute amount) or dispensing tips $212_1$ to $212_n$ (for a large amount) are arranged; a suction/discharge driving unit 53 for moving a plunger of each of the dispensing cylinders in the vertical direction and causing the dispensing tips to suck and discharge liquid; a tip detaching mechanism 59 capable of detaching the dispensing tip $211_i$ detachably attached to the nozzle $13_i$; a magnetic force unit 57 capable of applying a magnetic field to the dispensing tips $211_i$ attached to the nozzles 13 arranged in the nozzle arrangement unit 70; a dispensing head 50 having a nozzle Z-axis moving mechanism 75 capable of moving the nozzle arrangement unit 70 in the Z-axis with respect to the container group $20_i$; a dispensing head moving mechanism 51 capable of moving the dispensing head 50 relatively to the container group, for example, with respect to the Y-axis direction; a temperature controller 29 for performing a predetermined temperature control on a reaction container group $23_i$ of the container group; a CPU+program+memory 60 including CPU, ROM, RAM, various external memories, a communication function such as LAN, and a program stored in ROM or the like; and an operation panel 64 including a display unit such as liquid crystal display and an operation unit such as an operation key or a touch panel.

Here, the dispensing head moving mechanism 51 and the nozzle Z-axis moving mechanism correspond to the nozzle moving mechanism.

Each of the container groups $20_i$ includes: a reaction container the temperature of which can be controlled; liquid-storing units capable of storing various reagents, various specimens, a magnetic particle suspension, or the like; and tip-storing units for storing the respective dispensing tips $211_i$ in a state of being able to be attached to attachment portions formed at distal ends of the nozzles 13.

The CPU+program+memory 60 includes: an extraction control unit 61 for controlling extraction of a nucleic acid or a fragment thereof; a nucleic acid amplification control unit 62 for giving an instruction for an amplification treatment on an extracted nucleic acid; and a minute amount/large amount judgement and instruction unit 63 for judging whether a predetermined amount of liquid to be sucked and discharged is a minute amount or a large amount based on an instruction from the extraction control unit 61, the nucleic acid amplification control unit 62, or the operation panel 64 and giving an instruction to the suction/discharge driving unit 53. The extraction control unit 61 gives an instruction of extraction to the dispensing head moving mechanism 51, the nozzle Z-axis moving mechanism 75, the tip detaching mechanism 59, the temperature controller 29, the magnetic force unit 57, or the minute amount/large amount judgement and instruction unit 63. The nucleic acid amplification control unit 62 controls the dispensing head moving mechanism 51, the tip detaching mechanism 59, the suction/discharge driving unit 53, the nozzle Z-axis moving mechanism 75, and the minute amount/large amount judgement and instruction unit 63.

Figure 7:
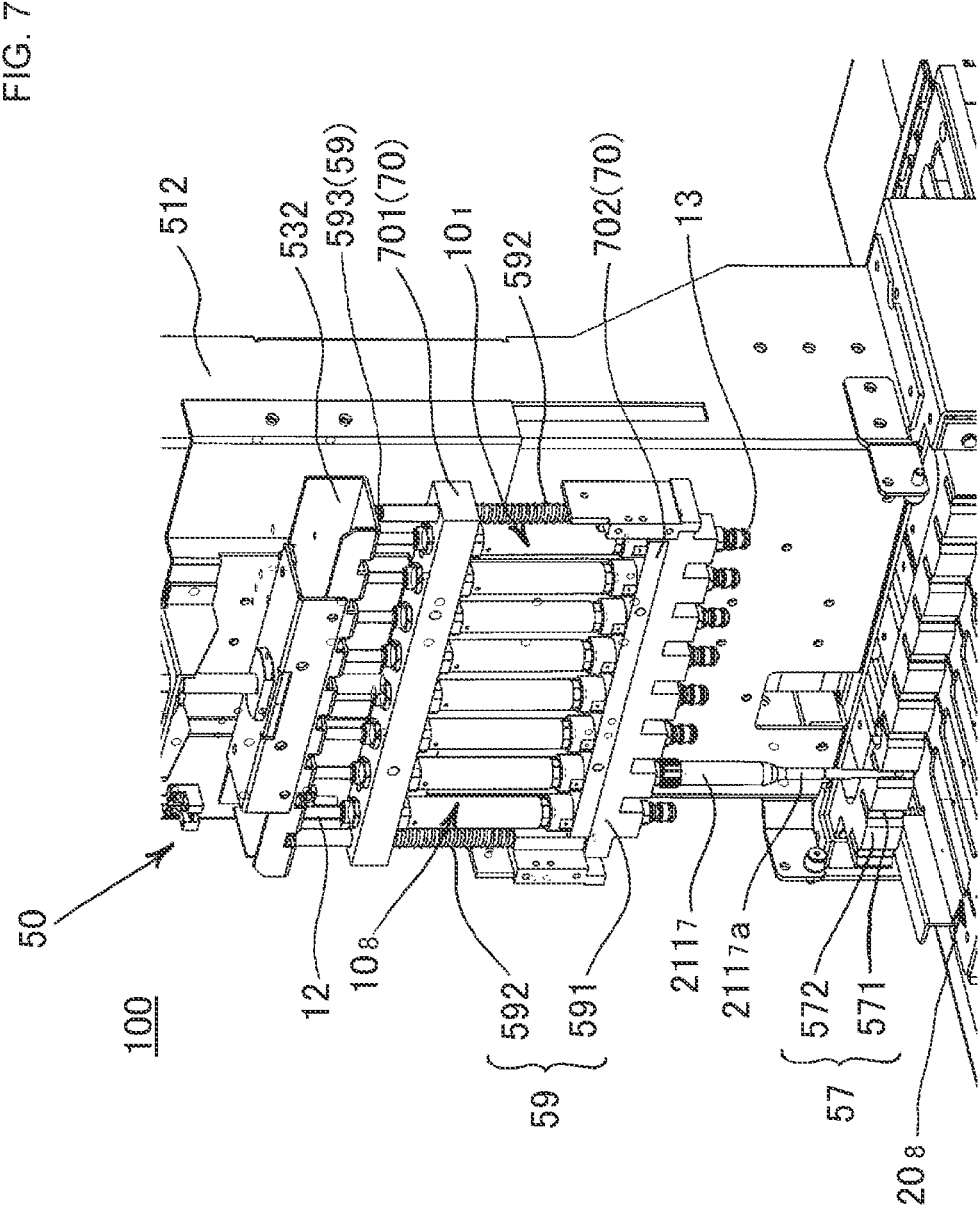
FIG. 7 is an enlarged perspective view illustrating the dispensing device of FIG. 6 with a large amount dispensing tip attached to a nozzle.
Figure 8:
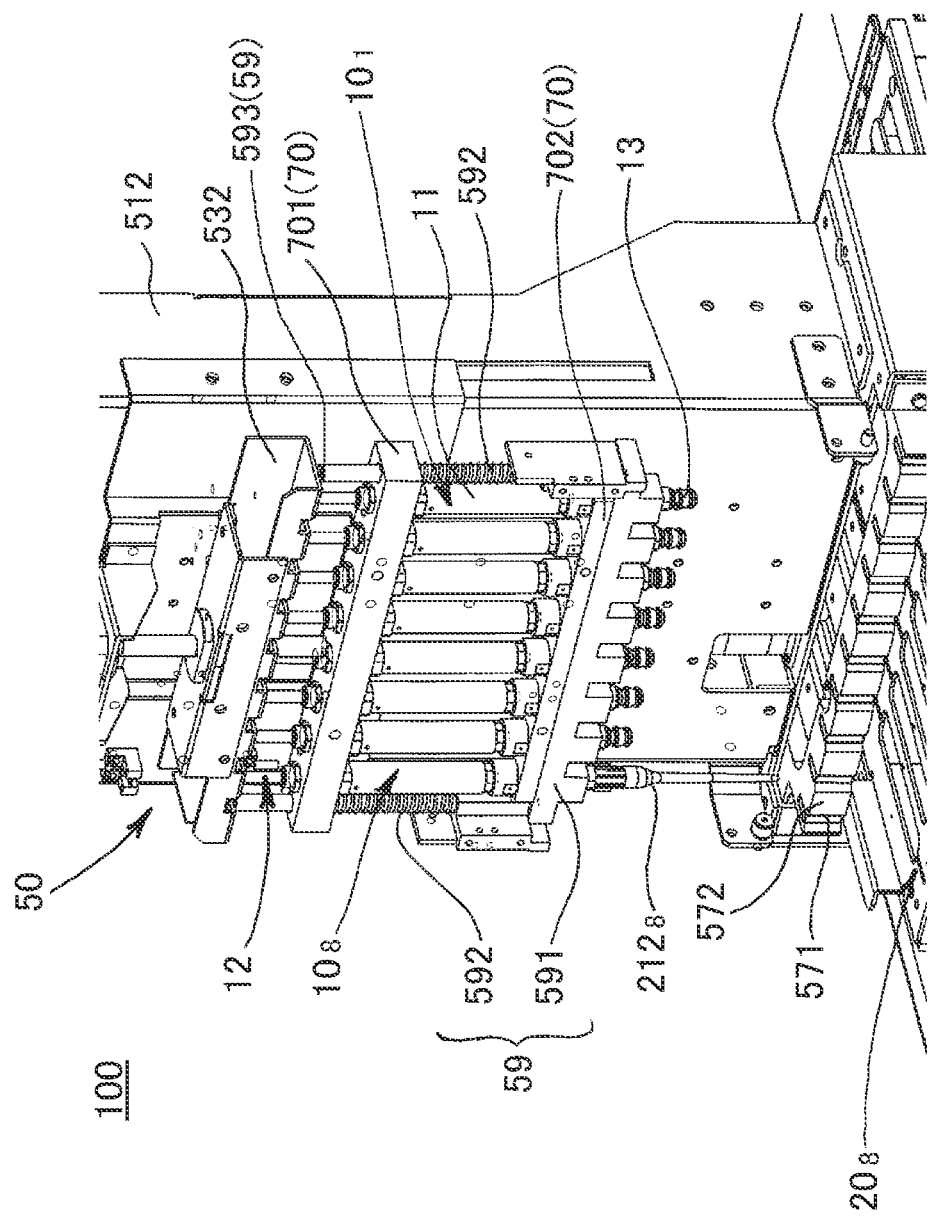
FIG. 8 is an enlarged perspective view illustrating the dispensing device of FIG. 6 with a minute amount dispensing tip attached to a nozzle.

Hereinafter, a more specific embodiment example of the above-described dispensing device 100 according to the first embodiment of the present invention will be described with reference to FIGS. 6 to 8.

Figure 6:
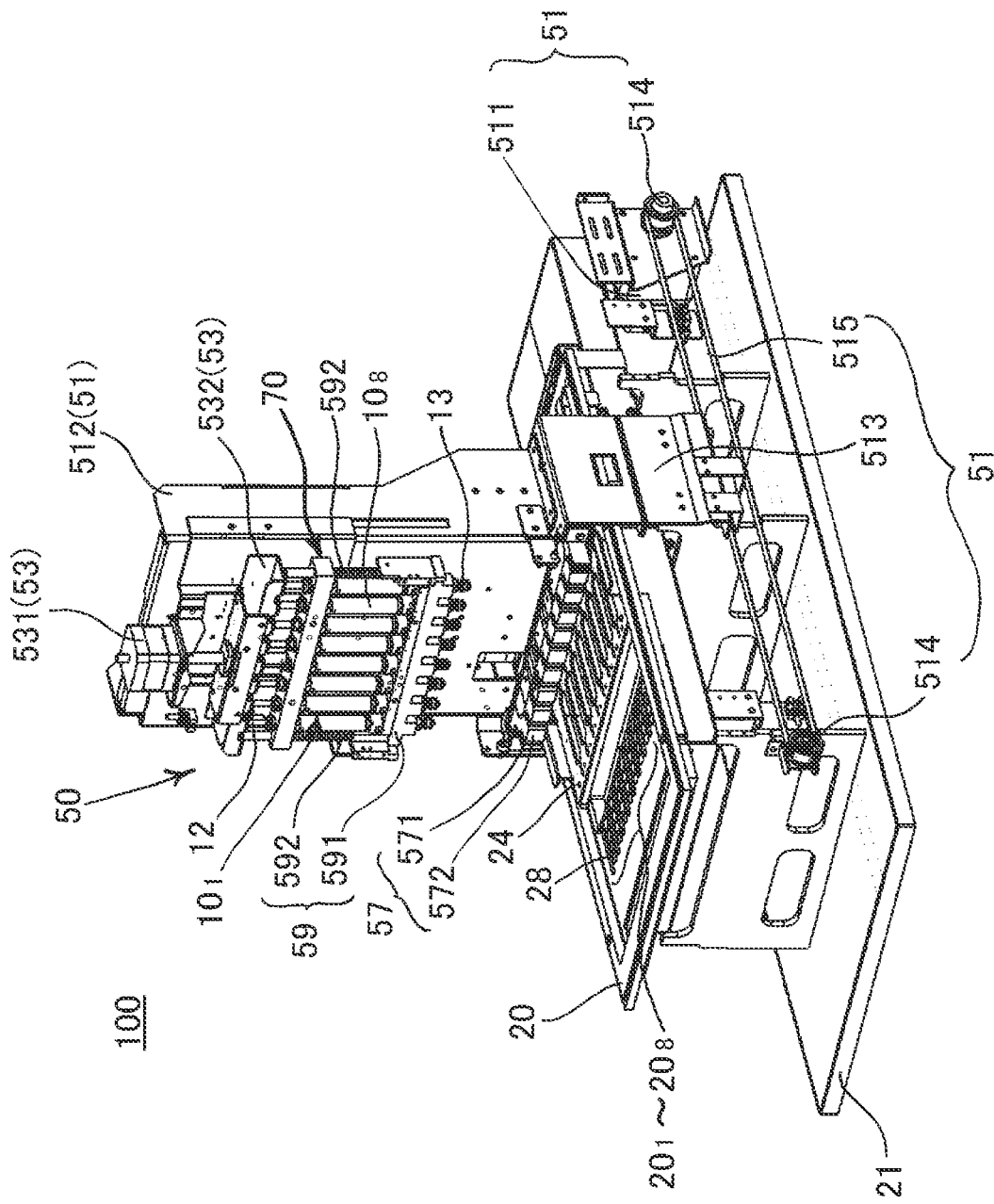
FIG. 6 is a perspective view illustrating the dispensing device according to the first or second embodiment of the present invention.

FIG. 6 is an overall perspective view of the dispensing device 100 according to an embodiment example of the present invention.

For example, the dispensing device 100 has a size of about 600 mm in a longitudinal direction (Y-axis direction), a transverse direction (X-axis direction), and a height (Z-axis direction). On the stage 20, mainly, the container groups $20_1$ to $20_8$ (n=8), the dispensing head 50 capable of moving in a serial arrangement direction (Y-axis direction) with respect to the container groups $20_1$ to $20_8$, the dispensing head moving mechanism 51 for moving the dispensing head 50 in the Y-axis direction, and the temperature controller 29 are provided on the stage 20. Note that the operation panel 64 and the CPU+program+memory 60 are attached to a housing (not illustrated) for housing these container groups $20_1$ to $20_8$ and the dispensing head 50.

The dispensing head 50 includes the nozzle arrangement unit 70 in which eight dispensing cylinders 10, provided so as to be movable in the vertical direction (Z-axis direction) with respect to a Y-axis moving frame 512 provided so as to be movable in the serial arrangement direction (Y-axis direction) are arranged in the X-axis direction at a predetermined pitch (for example, 18 mm) and the nozzles 13 (to which eight dispensing tips $211_i$ can be attached) provided in the dispensing cylinder $10_i$ (i=1 to 8, omitted hereinafter).

The dispensing head moving mechanism 51 includes: a Y-axis moving motor 511; a coupling tool 513 connected to a timing belt 515 driven by the Y-axis moving motor 511 to be movable in the Y-axis direction by movement of the timing belt 515; and two rotatable pulleys 514 engaged with the timing belt 515.

The nozzle arrangement unit 70 of the dispensing head 50 includes support plates 701 and 702 for supporting the cylinders $10_1$ to $10_8$ and the nozzles 13 communicating with the cylinders so as to arrange the cylinders $10_1$ to $10_8$ and the nozzles 13 at the above pitch, and the support plates 701 and 702 are supported so as to be movable in the Z-axis direction with respect to the Y axis moving frame 512. A Z-axis moving motor for moving the nozzle arrangement unit 70 in the Z-axis direction is provided in the Y-axis moving frame 512.

A plunger driving plate 532 for vertically driving the eight plungers 12 slidable in the dispensing cylinders $10_1$ to $10_8$ arranged in the nozzle arrangement unit 70 and a suction and discharge driving motor 531 for driving the plunger driving plate 532 are provided. Here, the plunger driving plate 532 and the motor 531 correspond to the suction/discharge driving unit 53.

A tip detaching member 591 is provided below the nozzle arrangement unit 70. The tip detaching member 591 is attached to lower ends of two shafts 592 supported by the nozzle arrangement unit 70 and movable downward while being urged upward, at both end portions thereof, and is thereby supported horizontally by the nozzle arrangement unit 70. An upper end 593 of each of the shafts 592 is located above the upper ends of the dispensing cylinders $10_1$ to $10_8$ but below the bottom dead center of the stroke (D) of normal suction and discharge of the plunger driving plate 532. The length of each of the shafts 592 is related to the above-described "r0 ($\neq$0)". The tip detaching mechanism 59 is provided in which the plunger driving plate 532 is lowered to the vicinity of upper ends of the dispensing cylinders $10_1$ to $10_8$ beyond the stroke (D), the upper ends 593 of the shafts 592 are thereby pushed downward, the shafts 592 are lowered to the vicinity of upper ends of the dispensing cylinders $10_1$ to $10_8$, and the tip detaching member 591 is thereby pushed downward and lowered. In the tip detaching member 591, eight holes each having an inner diameter larger than the outer diameter of an attachment portion of the nozzle 13 but smaller than the maximum outer diameter of the dispensing tip $211_i$, are formed at the above pitch so that the nozzles 13 penetrate through the eight holes.

The magnetic force unit 57 is obtained by providing ten magnets 571 capable of applying a magnetic field to an inside of the dispensing tip $211_i$ and removing the magnetic field therefrom by being provided so as to be able to come into and out of contact with a small diameter portion $211_i a$ of the dispensing tip $211_i$ in a movable body 572 movable in the Y-axis direction. Note that one magnet on each side is provided in order to apply a uniform magnetic field to each of the dispensing tips 211, and is different from eight magnets provided so as to be able to come into and out of each of the dispensing tips.

Figure 9:
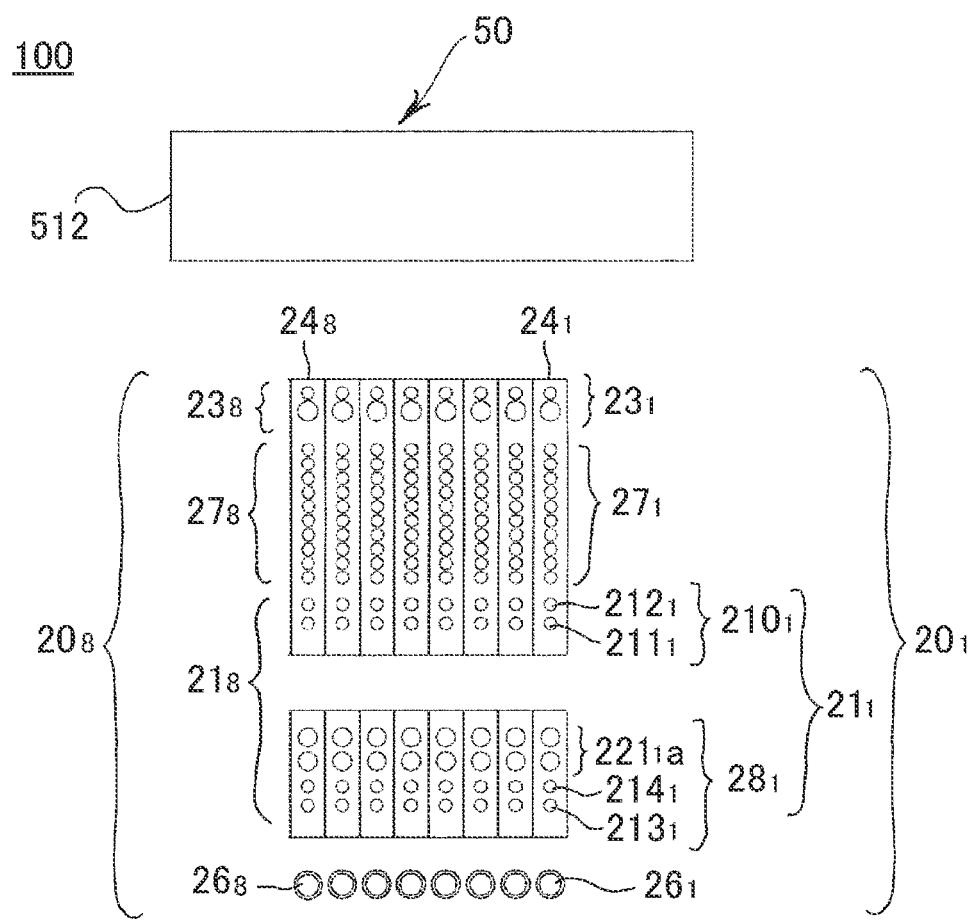
FIG. 9 is a plan view illustrating a container group disposed on a stage of the dispensing device illustrated in each of FIGS. 6 to 8.

As illustrated in FIG. 9, in each of the container groups $20_1$ to $20_8$ on the stage 20, for example, a cartridge container $24_i$ in which 14 reaction containers or various storing units are arranged in series, a cartridge container $28_i$ in which four various storing units are arranged in series, and a parent specimen tube $26_i$ are arranged. The container groups are arranged in parallel with each other in the serial arrangement direction such that the same type of storing units, the same type of reaction containers, and the same type of parent specimen tubes are located at the same positions respectively in the serial arrangement direction (Y-axis direction).

Here, the cartridge container $24_i$ includes two reaction containers $23_i$ having different volumes, a liquid-storing unit group $27i$ of ten pre-packed or emμLy liquid-storing units, and a tip-storing unit group $210_i$ for storing two dispensing tips $211_i$ and $212_i$. The cartridge container $28_i$ includes a storing unit for storing two scattering prevention plugs $221_i a$ and a storing unit for storing piercing tips $213_i$ and $214_i$. Note that the scattering prevention plugs $221_i$ are used for sealing a container (not illustrated) to which ultrasonic waves can be applied, applying ultrasonic waves or the like to a sample or the like inside, and crushing a cell to facilitate extraction of a nucleic acid, and attached to the nozzle 13 so as to be movable.

Subsequently, regarding operation of the dispensing device 100 according to the present example, a series of treatment operations until real-time PCR of a nucleic acid of a specimen containing bacteria is performed will be described below.

In step S1, a specimen to be tested, various cleaning liquids, and various reagents are supplied onto the stage 20 in advance, and liquid-storing units pre-packed with reagents or the like is attached thereto.

By operating a touch panel or the like of the operation panel 64, an instruction to start a separation and extraction treatment and an amplification treatment is made.

Then, in step S2, the extraction control unit 61 provided in the CPU+program+memory 60 of the dispensing device 100 instructs the dispensing head moving mechanism 51 to move the dispensing head 50 in the Y-axis direction to locate the dispensing head 50 in a corresponding tip-storing unit of a cartridge container $28_i$ of each of the container groups $20_i$. The piercing tip 213 is attached to the nozzle 13 by the nozzle Z-axis moving mechanism 75. The dispensing head 50 is further moved in the Y-axis direction to locate the piercing tip $213_i$ above the first liquid-storing unit of the liquid-storing unit group $27_i$ of the container group, and the nozzle is lowered by the nozzle Z-axis moving mechanism 75 to pierce a film covering an opening of the liquid-storing unit. Similarly, the dispensing head 50 is moved in the Y-axis direction to sequentially pierce the other liquid-storing units of the liquid-storing unit group $27_i$ and the reaction container group $23_i$, and the piercing tip $213_i$ is detached into the tip-storing unit by the tip detaching mechanism 59.

In step S4, the dispensing head 50 is again moved in the Y-axis direction and moved to a tip or the like-storing unit group $21_i$. The respective nozzles $13_i$ are lowered by the nozzle Z-axis moving mechanism 75, and the dispensing tip $211_i$ is attached thereto. Next, the dispensing tip $211_i$ is raised by the nozzle Z-axis moving mechanism 75 and then moved along the Y-axis by the dispensing head moving mechanism 51 to reach the eighth liquid-storing unit of the liquid-storing unit group 27$_i$, and a predetermined amount of isopropanol is sucked from the liquid-storing unit. The dispensing tip 211$_i$ is moved again along the X-axis, and dispensing is performed into a solution component (NaCl and SDS solution) stored in each of the third and fifth liquid-storing units and distilled water stored in the sixth liquid-storing unit in a predetermined amount. As a result, 500 μL of a bonding buffer solution (NaCl, SDS, and isopropanol), 700 μL of cleaning liquid 1 (NaCl, SDS, and isopropanol), and 700 μL of cleaning liquid 2 (water: 50%, isopropanol: 50%) are prepared in the third, fifth, and sixth liquid-storing units as separation and extraction solutions, respectively.

At this time, the minute amount/large amount judgement and instruction unit 63 judges that the predetermined amount is a large amount, and the thick shaft portion 15 is located in the large amount suction and discharge section to slide in the large diameter region 18 by a distance D corresponding to the predetermined amount.

In step S5, the dispensing tip 211$_i$ is moved to the parent specimen tube 26$_i$ storing a specimen separately, in the tip or the like-storing unit group 21$_i$. Thereafter, the small diameter portion 211$_i$a of the dispensing tip 211$_i$ is lowered and inserted thereinto using the nozzle Z-axis moving mechanism 75, and the driving plate 532 of the suction/discharge driving unit 53 is raised and lowered. Suction and discharge of a suspension of the specimen stored in the parent specimen tube 26$_i$ are thereby repeated to make the specimen suspended in the liquid. Thereafter, the specimen suspension is sucked into the dispensing tip 211$_i$. The specimen suspension is moved to the first liquid-storing unit of the liquid-storing unit group 27$_i$ storing Lysis 1 (enzyme) as a separation and extraction solution along the Y-axis by the dispensing head moving mechanism 51. The small diameter portion 211$_i$a of the dispensing tip 211$_i$ is inserted thereinto through a hole of a pierced film, and suction and discharge are repeated in order to stir the specimen suspension and the Lysis 1.

In step S6, the whole amount of the stirred liquid is sucked by the dispensing tip 211$_i$ to be stored in the reaction container 232$_i$ formed of a reaction tube held in the storing hole set at 55° C. by the constant temperature controller, and is incubated. As a result, a protein contained in the specimen is destroyed to reduce the molecular weight thereof. After a lapse of a predetermined time, the dispensing tip 211$_i$ is moved to the second liquid-storing unit of the liquid-storing unit group 27$_i$ by the dispensing head moving mechanism 51 while the reaction solution is left in the reaction tube. The whole amount of the liquid stored in the second liquid-storing unit is sucked using the nozzle Z-axis moving mechanism 75 and the suction/discharge driving unit 53, and transferred by the dispensing head moving mechanism 51 using the dispensing tip 211$_i$. The small diameter portion is inserted into the third liquid-storing unit through the hole of the film to discharge the reaction solution.

In step S7, a bonding buffer solution as a separation and extraction solution stored in the third liquid-storing unit and the reaction solution are stirred to further dehydrate a solubilized protein, and a nucleic acid or a fragment thereof is dispersed in the solution.

In step S8, the small diameter portion of the dispensing tip 211$_i$ is inserted into the third liquid-storing unit through the hole of the film using the dispensing tip 211$_i$, and the whole amount is sucked. The dispensing tip 211$_i$ is raised by the nozzle Z-axis moving mechanism 75. The reaction solution is transferred to the fourth liquid-storing unit. A magnetic particle suspension stored in the fourth liquid-storing unit and the reaction solution are stirred. A cation structure in which a Na$^+$ ion is bonded to a hydroxy group formed on surfaces of magnetic particles contained in the magnetic particle suspension is formed. Therefore, negatively charged DNA is capLured by the magnetic particles.

In step S9, by making the magnet 571 of the magnetic force unit 57 approach the small diameter portion 211$_i$a of the dispensing tip 211$_i$, the magnetic particles are adsorbed by an inner wall of the small diameter portion 211$_i$a of the dispensing tip 211$_i$. The dispensing tip 211$_i$ is raised by the nozzle Z-axis moving mechanism 75 while the magnetic particles are adsorbed by the inner wall of the small diameter portion 211$_i$a of the dispensing tip 211$_i$. The dispensing tip 211$_i$ is moved from the fourth liquid-storing unit to the fifth liquid-storing unit using the dispensing head moving mechanism 51, and the small diameter portion 211$_i$a is inserted thereinto through the hole of the film.

While a magnetic force to an inside of the small diameter portion 211$_i$a of the dispensing tip 211$_i$ is removed by separating the magnet 571 of the magnetic force unit 57 from the small diameter portion 211$_i$a, a cleaning liquid 1 (NaCl, SDS, and isopropanol) stored in the fifth liquid-storing unit is repeatedly sucked and discharged. The magnetic particles are thereby detached from the inner wall, are stirred in the cleaning liquid 1, and a protein is thereby cleaned. Thereafter, while the magnetic particles are adsorbed by the inner wall of the small diameter portion 211$_i$a of the dispensing tip 211$_i$ by making the magnet 571 of the magnetic force unit 57 again approach the small diameter portion 211$_i$a, the dispensing tip 211$_i$ is moved by the nozzle Z-axis moving mechanism 75 from the fifth liquid-storing unit to the sixth liquid-storing unit by the dispensing head moving mechanism 51.

In step S10, the small diameter portion 211$_i$a of the dispensing tip 211$_i$ is inserted through the hole of the film using the nozzle Z-axis moving mechanism 75. While the magnetic force to the inside of the small diameter portion 211$_i$a of the dispensing tip 211$_i$ is removed by separating the magnet 571 of the magnetic force unit 57 from the small diameter portion 211$_i$a, a cleaning liquid 2 (isopropanol) stored in the sixth liquid-storing unit is repeatedly sucked and discharged. The magnetic particles are thereby stirred in the liquid, NaCl and SDS are removed, and a protein is cleaned. Thereafter, while the magnetic particles are adsorbed by the inner wall of the small diameter portion 211$_i$a of the dispensing tip 211$_i$ by making the magnet 571 of the magnetic force unit 57 again approach the small diameter portion 211$_i$a, the dispensing tip 211$_i$ is raised by the nozzle Z-axis moving mechanism 75, and then moved from the sixth liquid-storing unit to the seventh liquid-storing unit storing distilled water by the dispensing head moving mechanism 51.

In step S11, the small diameter portion 211$_i$a of the dispensing tip 211$_i$ is lowered by the nozzle Z-axis moving mechanism 75 through the hole. By repeating suction and discharge of the distilled water at a slow flow rate while the magnetic force is applied to the inside of the small diameter portion 211$_i$a of the dispensing tip 211$_i$, the cleaning liquid 2 (isopropanol) is replaced with the water and removed. Thereafter, by sucking and discharging the magnetic particles repeatedly in distilled water as the dissociated solution while the magnet 571 of the magnetic force unit 57 is separated from the small diameter portion 211$_i$a of the dispensing tip 211$_i$ and the magnetic force is removed, stirring is performed, and a nucleic acid retained by the magnetic particles or a fragment thereof is dissociated (eluted) from the magnetic particles into the liquid. Thereafter, by making the magnet 571 approach the small diameter portion $211_i a$ of the dispensing tip $211_i$, the magnetic field is applied to the inside of the small diameter portion, the magnetic particles are adsorbed by the inner wall, and the solution containing the extracted nucleic acid or the like is left in the eighth liquid-storing unit. The dispensing tip $211_i$ is moved to the storing unit in which the dispensing tip $211_i$ of the tip or the like-storing unit group $21_i$ was stored by the dispensing head moving mechanism 51. The dispensing tip $211_i$ which has adsorbed the magnetic particles is detached from the nozzle $71_i$ into the storing unit together with the magnetic particles using the detaching member 591 of the tip detaching mechanism 59.

cycle by real time PCR, for example, a cycle of heating the PCR tube $231_i$ at 96° C. for five seconds and heating the PCR tube $231_i$ at 60° C. for 15 seconds, for example, 49 times.

Next, in order to compare the accuracy of the dispensing cylinder according to the present embodiment with a conventional cylinder, an operation of sucking and discharging a predetermined amount (for example, 5 µL and 100 µL) of liquid was performed using the dispensing device 100. A coefficient of variation indicating how much the amount of liquid actually sucked and discharged varies from a target predetermined amount was measured.

Results thereof are illustrated below.

| 5 µL dispensing with 2.5 mm φ dispensing cylinder according to the present embodiment Acquired data (µL) | | | | | | | | |
|---|---|---|---|---|---|---|---|---|
| | Lane1 | Lane2 | Lane3 | Lane4 | Lane5 | Lane6 | Lane7 | Lane8 |
| N = 1 | 5.1 | 5.0 | 4.9 | 4.8 | 4.9 | 4.7 | 4.8 | 5.1 |
| N = 2 | 5.0 | 5.1 | 4.9 | 4.8 | 4.9 | 4.8 | 4.9 | 4.8 |
| N = 3 | 4.8 | 4.8 | 4.8 | 4.7 | 4.9 | 4.8 | 4.7 | 4.7 |
| Average | | Standard deviation | | | Coefficient of variation (CV %) | | | |
| 4.8 | | 0.12 | | | 2.5% | | | |

| 100 µL dispensing with 10 mm φ dispensing cylinder according to the present embodiment Acquired data (µL) | | | | | | | | |
|---|---|---|---|---|---|---|---|---|
| | Lane1 | Lane2 | Lane3 | Lane4 | Lane5 | Lane6 | Lane7 | Lane8 |
| N = 1 | 99.8 | 99.3 | 99.3 | 99.5 | 100.0 | 100.2 | 100.4 | 101.1 |
| N = 2 | 99.2 | 98.8 | 99.3 | 99.5 | 99.2 | 99.8 | 99.7 | 99.6 |
| N = 3 | 100.0 | 99.1 | 99.5 | 99.5 | 97.7 | 99.7 | 100.0 | 100.6 |
| Average | | Standard deviation | | | Coefficient of variation (CV %) | | | |
| 99.6 | | 0.64 | | | 0.65% | | | |

Subsequently, steps S12 to S15 correspond to a nucleic acid amplification step.

In step S12, a new minute amount dispensing tip $212_i$ is attached to the nozzle $13_i$. The solution containing the nucleic acid or the like stored in the eighth liquid-storing unit is sucked, transferred to the PCR tube $231_i$ storing an amplification solution $234_i$ in advance, discharged, and introduced into the container. Hereinafter, in accordance with a predetermined procedure, in the PCR tube $231_i$, the nucleic acid amplification control unit 62 instructs the temperature controller 29 to repeat a temperature control Meanwhile, a measurement example is illustrated in a case where 5 µL as a predetermined amount is sucked and discharged using a device including eight rows of container groups having conventional cylinders incorporated therein.

| 5 µL dispensing with 4 mm φ dispensing cylinder according to conventional example Acquired data (µL) | | | | | | | | |
|---|---|---|---|---|---|---|---|---|
| | Lane1 | Lane2 | Lane3 | Lane4 | Lane5 | Lane6 | Lane7 | Lane8 |
| N = 1 | 5.7 | 5.3 | 5.3 | 5.9 | 5.0 | 5.0 | 5.7 | 5.6 |
| N = 2 | 5.5 | 5.3 | 5.8 | 6.0 | 5.4 | 5.3 | 5.7 | 5.7 |
| N = 3 | 5.3 | 5.4 | 5.1 | 6.0 | 5.5 | 5.7 | 5.6 | 5.9 |
| Average | | Standard deviation | | | Coefficient of variation (CV %) | | | |
| 5.5 | | 0.29 | | | 5.2% | | | |

Comparison among the above coefficients of variation clearly indicates that the dispensing cylinder according to the present embodiment has a small coefficient of variation and high accuracy even when a minute amount of liquid is dispensed.

A reason for this is as follows. That is, in a case of dispensing a minute amount of liquid and in a case of dispensing a large amount of liquid, in a dispensing cylinder according to a conventional example, a single dispensing cylinder is used, and the dispensing cylinder has a plunger and a cavity having the same cross sectional area. Meanwhile, in the dispensing cylinder according to the present embodiment, although a single dispensing cylinder is used, in a case of dispensing a minute amount of liquid, a thin shaft portion having a sufficiently smaller cross sectional area than the cross sectional area is slid, and in a case of dispensing a large amount of liquid, a thick shaft portion having a sufficiently larger sectional area than the cross sectional area is slid. Therefore, regarding a minute amount of liquid, a sufficient sliding distance can be ensured, and therefore highly accurate dispensing is possible. Furthermore, in a case of dispensing a large amount of liquid, a sliding distance can be reduced, and therefore a compact dispensing cylinder can be provided. Actually, in the dispensing cylinder according to the present embodiment, even in a case of a minute amount (5 μL) or a large amount (100 μL), the sliding distance is about 1 mm. Therefore, highly accurate measurement is possible. In order to dispense 1000 μL of liquid, a sliding distance of at most 13 mm is enough. Meanwhile, in a device according to a conventional example, in a case of a small volume, the sliding distance is only about 0.5 mm, but in a case of a large volume (100 μL), the sliding distance is about 9 mm, and the sliding distance is about 90 mm in order to dispense 1000 μL of liquid. This means that the scale of the device may be expanded as compared with the present embodiment.

The above-described embodiments have been described specifically for the purpose of better understanding of the present invention, and do not limit another embodiment. Therefore, the above-described embodiments can be modified within a range not changing the gist of the invention. For example, as an embodiment, only the case where the airtight seal members are provided in the small diameter region and the thick shaft portion has been described. However, the present invention is not limited to this case. Needless to say, the present invention can also be applied to a case where the airtight seal members are provided in the thin shaft portion and the thick shaft portion, a case where the airtight seal members are provided in the thin shaft portion and the large diameter region, and a case where the airtight seal members are provided in the small diameter region and the large diameter region. In the above description, the case of r0=0 is illustrated in the drawings, but it is sufficiently possible to estimate a case of r0≠0 from the drawings. Only the dispensing cylinder $10_i$ according to the first embodiment has been described as an example of the dispensing device. However, needless to say, the dispensing cylinder $30_i$ according to the second embodiment can be used. As an example of the ventilation passage, the case where only the ventilation hole and the lateral hole are present has been described. However, the present invention can also be applied to a case where a groove and a slit are formed. Regarding the dispensing device, an example of a nucleic acid treatment has been described, but the present invention is not limited to this example. Needless to say, the present invention can also be applied to a treatment of a protein or the like.

In addition, the numerical values, the number of times, the shape, the number (for example, the number of the dispensing cylinders used in the dispensing device is not limited to eight), the amount, and the like are not limited to those in these cases.

INDUSTRIAL APPLICABILITY

The present invention relates to a dispensing cylinder, and a dispensing device and a dispensing treatment method using the dispensing cylinder, performs dispensing of a specimen collected from a patient or the like, a treatment thereof, a test thereof, optical measurement thereof, and recording thereof, and can be used particularly in a field requiring handling of a biopolymer such as a gene, an immune system, an amino acid, a protein, or a sugar, and a low molecular biological substance, for example, in various fields such a biochemistry field, an industrial field, an agriculture field such as food, agriculture, or fishery processing, a pharmaceutical field, and a medical field such as hygiene, health, immunity, diseases, or genetics.

REFERENCE SIGNS LIST

10, 30 Dispensing cylinder
$10_1$ to $10_n$ Dispensing cylinder
11, 31 Cylinder (main body)
12, 32 Plunger
13, 33 Nozzle
14, 34 Thin shaft portion
15, 35 Thick shaft portion
16, 36 Small diameter region
17, 37 Airtight seal member
18, 38 Large diameter region
19, 39 Floating region
20 Stage
$20_1$ to $20_n$ Container group
$211i$ to $211_n$ Large amount dispensing tip
$212_1$ to $212_n$ Minute amount dispensing tip
40 Guide portion
41 Ventilation hole (ventilation passage)
42 Lateral hole (ventilation passage)
50 Dispensing head
51 Dispensing head moving mechanism (nozzle moving mechanism)
59 Tip detaching mechanism
60 CPU+program+memory
100 Dispensing device

The invention claimed is:

1. A dispensing cylinder comprising:
a cylinder having a cavity that extends through the cylinder in an axial direction, the cavity having a large diameter region with a large inner peripheral surface, a small diameter region having a small inner peripheral surface, and a floating region located between the large diameter region and the small diameter region, wherein a diameter of the large inner peripheral surface is larger than a diameter of the small inner peripheral surface;
a nozzle configured to be coupled to a dispensing tip and provided at one end of the cylinder, the nozzle having a through hole that is fluidly coupled to the cavity and extends in the axial direction; and
a plunger provided within the cavity and configured to slide in the axial direction, the plunger having a thick shaft portion, a thin shaft portion protruding from a distal end of the thick shaft portion in the axial direction and terminating in a distal end, and a guide portion extending from the distal end of the thin shaft portion in the axial direction, wherein a diameter of the thick shaft portion is larger than a diameter of the thin shaft portion;
wherein the thick shaft portion is configured to slide in the large diameter region and the floating region and wherein the thin shaft portion is configured to slide in the small diameter region; and wherein the guide portion has a ventilation passage configured to fluidly couple the through hole of the nozzle with the floating region.

2. The dispensing cylinder according to claim 1, further comprising:
   a first airtight seal member coupled to the large inner peripheral surface of the large diameter region or an outer peripheral surface of the thick shaft portion; and
   a second airtight seal member coupled to the small inner peripheral surface of the small diameter region or an outer peripheral surface of the thin shaft portion.

3. The dispensing cylinder according to claim 1,
   wherein at least a portion of the ventilation passage extends in the axial direction.

4. The dispensing cylinder according to claim 3, wherein the ventilation passage further comprises a lateral hole portion.

5. A dispensing device, comprising:
   a stage;
   a container group disposed on the stage and including a liquid-storing unit capable of storing various reagents and specimens;
   one or more dispensing tips;
   a tip-storing unit for storing the one or more dispensing tips;
   one or more dispensing cylinders, each of the one or more dispensing cylinders comprising:
      a cylinder having a cavity that extends through the cylinder in an axial direction, the cavity having a large diameter region with a large inner peripheral surface, a small diameter region having a small inner peripheral surface, and a floating region located between the large diameter region and the small diameter region, wherein a diameter of the large inner peripheral surface is larger than a diameter of the small inner peripheral surface;
      a nozzle configured to be coupled to a dispensing tip and provided at one end of the cylinder, the nozzle having a through hole that is fluidly coupled to the cavity and extends in the axial direction; and
      a plunger provided within the cavity and configured to slide in the axial direction, the plunger having a thick shaft portion, a thin shaft portion protruding from a distal end of the thick shaft portion in the axial direction and terminating in a distal end, and a guide portion extending from the distal end of the thin shaft portion in the axial direction, wherein a diameter of the thick shaft portion is larger than a diameter of the thin shaft portion;
   wherein the thick shaft portion is configured to slide in the large diameter region and the floating region, and wherein the thin shaft portion is configured to slide in the small diameter region; and
   wherein the guide portion has a ventilation passage configured to fluidly couple the through hole of the nozzle with the floating region;
   wherein each of the one or more dispensing tips is detachably attached to a respective nozzle of each dispensing cylinder;
   a dispensing head comprising
      a nozzle arrangement unit in which the one or more nozzles of the one or more dispensing cylinders are arranged;
      a suction/discharge driving unit for moving respective one or more of the plungers of the one or more dispensing cylinders in a vertical direction and sucking and discharging liquid with respect to the one or more dispensing tips; and
      a nozzle moving mechanism capable of moving the one or more nozzles relative to the container group; and
   a minute amount/large amount judgement and instruction unit coupled to the suction/discharge driving unit and configured to:
      receive an instruction to suck and discharge a predetermined amount of liquid to the one or more dispensing tips;
      determine whether the predetermined amount is within a first amount range or a second amount range, wherein the first amount range is separate from and smaller than the second amount range,
      responsive to a determination that the predetermined amount is within the first amount range, instruct the suction/discharge driving unit to slide the thin shaft portions of the one or more dispensing cylinders by a distance corresponding to the predetermined amount within the small diameter region, and
      responsive to a determination that the predetermined amount is within the second amount range, instruct the suction/discharge driving unit to slide the thick shaft portions of the one or more dispensing cylinders by a distance corresponding to the predetermined amount within the large diameter region.

6. The dispensing device according to claim 5, further comprising:
   a first airtight seal member coupled to an inner peripheral surface of the large diameter region or an outer peripheral surface of the thick shaft portion; and
   a second airtight seal member coupled to an inner peripheral surface of the small diameter region or an outer peripheral surface of the thin shaft portion.

7. The dispensing device according to claim 5,
   wherein at least a portion of the ventilation passage extends in the axial direction.

8. The dispensing device according to claim 5, wherein:
   the dispensing head further comprises a tip detaching mechanism configured to detach each of the one or more dispensing tips attached to the one or more nozzles of the one or more dispensing cylinders responsive by lowering the suction/discharge driving unit.

9. A dispensing treatment method, comprising:
   receiving, at a control unit, an instruction to suck or discharge a predetermined amount of liquid;
   determining, at a minute amount/large amount judgement and instruction unit within the control unit, whether the predetermined amount is within a first amount range or a second amount range, wherein the first amount range is separate from and smaller than the second amount range;
   attaching, using a dispensing head moving mechanism operably coupled to the control unit, a dispensing tip to a dispensing cylinder, wherein the dispensing cylinder comprises:
      a cylinder having a cavity that extends through the cylinder in an axial direction, the cavity having a large diameter region with a large inner peripheral surface, a small diameter region having a small inner peripheral surface, and a floating region located between the large diameter region and the small diameter region, wherein a diameter of the large inner peripheral surface is larger than a diameter of the small inner peripheral surface;

a nozzle configured to be coupled to the dispensing tip and provided at one end of the cylinder, the nozzle having a through hole that is fluidly coupled to the cavity and extends in the axial direction; and a plunger provided within the cavity and configured to slide in the axial direction, the plunger having a thick shaft portion, a thin shaft portion protruding from a distal end of the thick shaft portion in the axial direction and terminating in a distal end, and a guide portion extending from the distal end of the thin shaft portion in the axial direction, wherein a diameter of the thick shaft portion is larger than a diameter of the thin shaft portion;

wherein the thick shaft portion is configured to slide in the large diameter region and the floating region, and wherein the thin shaft portion is configured to slide in the small diameter region; and wherein the guide portion has a ventilation passage configured to fluidly couple the through hole of the nozzle with the floating region;

responsive to a determination that the predetermined amount is within the first amount range, sucking and discharging the first amount range of liquid to the dispensing tip by sliding the thin shaft portion in the small diameter region by a distance corresponding to the predetermined amount; and responsive to a determination that the predetermined amount is within the second amount range, sucking and discharging the second amount range of liquid to the dispensing tip by sliding the thick shaft portion in the large diameter region by a distance corresponding to the predetermined amount.

10. The dispensing treatment method according to claim 9, wherein:

sucking and discharging the first amount range of liquid further comprises the thick shaft portion moving in the floating region.

11. The dispensing treatment method according to claim 9, wherein at least a portion of the ventilation passage extends in the axial direction.

\* \* \* \* \*